United States Patent
Fujiwara

(10) Patent No.: US 8,825,524 B2
(45) Date of Patent: Sep. 2, 2014

(54) ELECTRONIC BOOK PROVISION SYSTEM AND ELECTRONIC BOOK DISTRIBUTION DEVICE

(75) Inventor: Yusuke Fujiwara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/117,036

(22) PCT Filed: Dec. 21, 2011

(86) PCT No.: PCT/JP2011/079667
§ 371 (c)(1),
(2), (4) Date: Apr. 7, 2014

(87) PCT Pub. No.: WO2012/157144
PCT Pub. Date: Nov. 22, 2012

(65) Prior Publication Data
US 2014/0207583 A1    Jul. 24, 2014

(30) Foreign Application Priority Data
May 13, 2011   (JP) ................................ 2011-108714

(51) Int. Cl.
*G06Q 30/02* (2012.01)
(52) U.S. Cl.
CPC ........ *G06Q 30/0277* (2013.01); *G06Q 30/0273* (2013.01)
USPC ....................................... 705/14.4
(58) Field of Classification Search
CPC .................................. G06Q 30/0241–30/0277
USPC ............................................ 705/14.4, 14.49
See application file for complete search history.

(56) References Cited

U.S. PATENT DOCUMENTS

| | | | |
|---|---|---|---|
| 2003/0028432 A1* | 2/2003 | Troyansky et al. | ............. 705/14 |
| 2009/0317019 A1* | 12/2009 | Puliur | ........................ 382/294 |
| 2012/0011001 A1* | 1/2012 | Gross et al. | ................ 705/14.66 |

FOREIGN PATENT DOCUMENTS

| | | | |
|---|---|---|---|
| JP | 2000-305552 A | 11/2000 |
| JP | 2003-016343 A |  1/2003 |
| JP | 2003-288528 A | 10/2003 |
| JP | 2007-156783 A |  6/2007 |
| JP | 2008-282114 A | 11/2008 |
| JP | 2010-238253 A | 10/2010 |

OTHER PUBLICATIONS

International Preliminary Report on Patentability and Written Opinion for corresponding PCT Application PCT/JP2011/079667, dated Nov. 19, 2013.
International Search Report for PCT/JP2011/079667, dated Feb. 28, 2012.

* cited by examiner

*Primary Examiner* — Donald L. Champagne
(74) *Attorney, Agent, or Firm* — Dennis M. Hubbs

(57) ABSTRACT

To provide an electronic book provision system that can make advertisements easily recognized by a user. The electronic book acquisition unit (104) acquires an electronic book in which tag is set in the text. The tag indicates a replacement target phrase in the text of the electronic book to be replaced with an advertising phrase on an advertisement. An advertising phrase acquisition unit (106) acquires the stored content of an advertising phrase storage unit (102) storing an advertising phrase such that the advertising phrase is associated with the replacement target phrase or the tags. An advertising phrase insertion unit (108) inserts the advertising phrases into the text of the electronic book based on the tags included in the text of the electronic book and the stored content of the advertising phrase storage unit (102). An output control unit (202) causes an output unit included in a terminal device (20) to output the electronic book in which the advertising phrase has been inserted by the advertising phrase insertion unit (108).

26 Claims, 20 Drawing Sheets

| TAG | ORIGINAL PHRASE | ADVERTISING PHRASE | ADVERTISER ID |
|---|---|---|---|
| car | car | sport car A | S0001 (COMPANY X) |
| coffee | canned coffee | black coffee B | S0002 (COMPANY Y) |
| | | cafe au lait C | S0003 (COMPANY Z) |
| restaurant | restaurant | | |

Taro quickly rushes into the car.

Taro drinks the canned coffee.

Taro enters the restaurant for dinner.

Taro quickly rushes into the sport car A.

Taro drinks the black coffee B.

Taro enters the restaurant for dinner.

FIG.5

Taro quickly rushes into the <ad>car</ad>.

Taro drinks the <ad>canned coffee</ad>.

Taro enters the <ad>restaurant</ad> for dinner.

FIG.6

| REPLACEMENT TARGET PHRASE | ADVERTISING PHRASE | ADVERTISER ID |
|---|---|---|
| car | sport car A | S0001 (COMPANY X) |
| canned coffee | black coffee B | S0002 (COMPANY Y) |
| | cafe au lait C | S0003 (COMPANY Z) |
| restaurant | | |

FIG.7

Taro quickly rushes into the <car>car</car>.

Taro drinks the <coffee>canned coffee</coffee>.

Taro enters the <restaurant>restaurant</restaurant> for dinner.

FIG.8

| TAG | ADVERTISING PHRASE | ADVERTISER ID |
|---|---|---|
| car | sport car A | S0001 (COMPANY X) |
| coffee | black coffee B | S0002 (COMPANY Y) |
| | cafe au lait C | S0003 (COMPANY Z) |
| restaurant | | |

FIG.9

Taro quickly rushes into the <car>.

Taro drinks the <coffee>.

Taro enters the <restaurant> for dinner.

FIG.10

| TAG | ORIGINAL PHRASE | ADVERTISING PHRASE | ADVERTISER ID |
|---|---|---|---|
| car | car | sport car A | S0001 (COMPANY X) |
| coffee | canned coffee | black coffee B | S0002 (COMPANY Y) |
| | | cafe au lait C | S0003 (COMPANY Z) |
| restaurant | restaurant | | |

| REPLACEMENT TARGET PHRASE | ADVERTISING PHRASE |
|---|---|
| car | sport car A |
| canned coffee | black coffee B |
| restaurant | |

Taro quickly rushes into the <ad>sport car A</ad>.

Taro drinks the <ad>black coffee B</ad>.

Taro enters the <ad>restaurant</ad> for dinner.

FIG.15

| ELECTRONIC BOOK ID | USER ID | DISTRIBUTION DATE AND TIME | ADVERTISING PHRASE INFORMATION |
|---|---|---|---|
| B0001 | U0001 | 2011/05/05 10:00:00 | ----- |
| ... | ... | ... | ... |

FIG.16

| TAG | ADVERTISING PHRASE |
|---|---|
| car | sport car A |
| coffee | black coffee B |
| restaurant | |

Taro quickly rushes into the <car>sport car A</car>.

Taro drinks the <coffee>black coffee B</coffee>.

Taro enters the <restaurant>restaurant</restaurant> for dinner.

| TAG | ORIGINAL PHRASE | ADVERTISING PHRASE |
|---|---|---|
| car | car | sport car A |
| coffee | canned coffee | black coffee B |
| restaurant | restaurant | |

FIG.19

Taro quickly rushes into the <car>sport car A.

Taro drinks the <coffee>black coffee B.

Taro enters the <restaurant>restaurant for dinner.

FIG.20

| CHAPTER | BILLING AMOUNT |
|---|---|
| FIRST CHAPTER | F1 |
| SECOND CHAPTER | F2 |
| THIRD CHAPTER | F3 |
| ... | ... |

FIG.21

| DISTANCE (d) | BILLING AMOUNT |
|---|---|
| $0 \leq d < D1$ | F1 |
| $D1 \leq d < D2$ | F2 |
| $D2 \leq d$ | F3 |

FIG.22

| OCCUPANCY (r) | BILLING AMOUNT |
|---|---|
| $0 \leq r < R1$ | F1 |
| $R1 \leq r < R2$ | F2 |
| $R2 \leq r$ | F3 |

FIG.23

| BILLING AMOUNT (f) | DISCOUNT AMOUNT |
|---|---|
| $0 \leq f < F1$ | S1 |
| $F1 \leq f < F2$ | S2 |
| $F2 \leq f$ | S3 |

FIG.24

| USER ID | POINT |
|---------|-------|
| U0001   | 1000  |
| ...     | ...   |

FIG.25

| BILLING AMOUNT (f) | POINT |
|--------------------|-------|
| $0 \leq f < F1$    | P1    |
| $F1 \leq f < F2$   | P2    |
| $F2 \leq f$        | P3    |

ELECTRONIC BOOK PROVISION SYSTEM AND ELECTRONIC BOOK DISTRIBUTION DEVICE

CROSS REFERENCE TO RELATED APPLICATIONS

This application is a National Stage of International Application No. PCT/JP2011/079667 filed Dec. 21, 2011, claiming priority based on Japanese Patent Application No. 2011-108714 filed on May 13, 2011. The contents of each of the above documents are incorporated herein by reference in their entirety.

TECHNICAL FIELD

The present invention relates to an electronic book provision system, a method of controlling an electronic book provision system, an electronic book distribution device, a method of controlling an electronic book distribution device, a terminal device, a method of controlling a terminal device, a program and an information storage medium.

BACKGROUND ART

An electronic book provision system that provides users with electronic books is known. As terminal devices for reading electronic books are widely used, the number of users who enjoy reading electronic books tend to be increased. Hence, attention is focused on electronic books as advertising media. In this respect, in a conventional electronic book, an advertising-specific space is previously secured, and an advertisement is displayed on such a space (for example, patent document 1).

CITATION LIST

Patent Document

Patent document 1: JP 2007-156783 A

SUMMARY OF INVENTION

Technical Problem

However, in the conventional electronic book, a user may skip the advertising-specific space, the advertisement may not be recognized by the user and the advertising effects may be insufficient.

The present invention is made in view of the foregoing problem, and an object of the present invention is to provide, for example, an electronic book provision system, a method of controlling an electronic book provision system, an electronic book distribution device, a method of controlling an electronic book distribution device, a terminal device, a method of controlling a terminal device, a program and an information storage medium, that allow an advertisement to be easily recognized by a user.

Solution to Problem

To solve the foregoing problem, an electronic book provision system according to the present invention is an electronic book provision system that provides a user with an electronic book, and that includes a terminal device and a distribution system for distributing an electronic book to the terminal device, wherein the distribution system includes: a means for acquiring an electronic book stored in an electronic book storage means for storing the electronic book where a tag is set in a text of the electronic book, wherein the tag indicates either a replacement target phrase in the text of the electronic book to be replaced with an advertising phrase on an advertisement or a position in the text of the electronic book into which the advertising phrase is inserted instead of an original phrase; and a means for acquiring the stored content of an advertising phrase storage means, wherein the advertising phrase storage means stores the advertising phrase such that the advertising phrase is associated with the replacement target phrase or the tag, in a case where the electronic book stored in the electronic book storage means is the electronic book where the tag indicating the replacement target phrase is set in the text, and the advertising phrase storage means stores the advertising phrase such that the advertising phrase is associated with the tag, in a case where the electronic book stored in the electronic book storage means is the electronic book where the tag indicating the position is set in the text, the electronic book provision system includes: an advertising phrase insertion means for inserting the advertising phrase into the text of the electronic book based on the tag included in the text of the electronic book and the stored content of the advertising phrase storage means, and the terminal device includes: an output control means for causing output means included in the terminal device to output the electronic book into which the advertising phrase has been inserted by the advertising phrase insertion means.

A method of controlling an electronic book provision system according to the present invention is a method of controlling an electronic book provision system that includes a terminal device and a distribution system for distributing an electronic book to the terminal device, the method including: a step of acquiring, by the distribution system, an electronic book stored in an electronic book storage means for storing the electronic book where a tag is set in a text of the electronic book, wherein the tag indicates either a replacement target phrase in the text of the electronic book to be replaced with an advertising phrase on an advertisement or a position in the text of the electronic book into which the advertising phrase is inserted instead of an original phrase; a step of acquiring, by the distribution system, the stored content of an advertising phrase storage means, wherein the advertising phrase storage means stores the advertising phrase such that the advertising phrase is associated with the replacement target phrase or the tag, in a case where the electronic book stored in the electronic book storage means is the electronic book where the tag indicating the replacement target phrase is set in the text, and the advertising phrase storage means stores the advertising phrase such that the advertising phrase is associated with the tag, in a case where the electronic book stored in the electronic book storage means is the electronic book where the tag indicating the position is set in the text; an advertising phrase insertion step of inserting, by the distribution system or the terminal device, the advertising phrase into the text of the electronic book based on the tag included in the text of the electronic book and the stored content of the advertising phrase storage means; and an output control step of causing, by the terminal device, output means included in the terminal device to output the electronic book into which the advertising phrase has been inserted by the advertising phrase insertion step.

An electronic book distribution device according to the present invention is an electronic book distribution device for distributing an electronic book to a terminal, the electronic book distribution device including: a means for acquiring an electronic book stored in an electronic book storage means for storing the electronic book where a tag is set in a text of the electronic book, wherein the tag indicates either a replacement target phrase in the text of the electronic book to be replaced with an advertising phrase on an advertisement or a position in the text of the electronic book into which the advertising phrase is inserted instead of an original phrase; a means for acquiring the stored content of an advertising phrase storage means, wherein the advertising phrase storage means stores the advertising phrase such that the advertising phrase is associated with the replacement target phrase or the tag, in a case where the electronic book stored in the electronic book storage means is the electronic book where the tag indicating the replacement target phrase is set in the text, and the advertising phrase storage means stores the advertising phrase such that the advertising phrase is associated with the tag, in a case where the electronic book stored in the electronic book storage means is the electronic book where the tag indicating the position is set in the text; an advertising phrase insertion means for inserting the advertising phrase into the text of the electronic book based on the tag included in the text of the electronic book and the stored content of the advertising phrase storage means; and an electronic book transmission means for transmitting the electronic book into which the advertising phrase has been inserted by the advertising phrase insertion means to the terminal device.

A method of controlling an electronic book distribution device according to the present invention is a method of controlling an electronic book distribution device for distributing an electronic book to a terminal device, the method including: a step of acquiring an electronic book stored in an electronic book storage means for storing the electronic book where a tag is set in a text of the electronic book, wherein the tag indicates either a replacement target phrase in the text of the electronic book to be replaced with an advertising phrase on an advertisement or a position in the text of the electronic book into which the advertising phrase is inserted instead of an original phrase; a step of acquiring the stored content of an advertising phrase storage means, wherein the advertising phrase storage means stores the advertising phrase such that the advertising phrase is associated with the replacement target phrase or the tag, in a case where the electronic book stored in the electronic book storage means is the electronic book where the tag indicating the replacement target phrase is set in the text, and the advertising phrase storage means stores the advertising phrase such that the advertising phrase is associated with the tag, in a case where the electronic book stored in the electronic book storage means is the electronic book where the tag indicating the position is set in the text; an advertising phrase insertion step of inserting the advertising phrase into the text of the electronic book based on the tag included in the text of the electronic book and the stored content of the advertising phrase storage means; and an electronic book transmission step of transmitting the electronic book into which the advertising phrase has been inserted by the advertising phrase insertion step to the terminal device.

A program according to the present invention is provided a program that causes a computer to function as an electronic book distribution device for distributing an electronic book to a terminal device, the program causing the computer to function as: a means for acquiring an electronic book stored in an electronic book storage means for storing the electronic book where a tag is set in a text of the electronic book, wherein the tag indicates either a replacement target phrase in the text of the electronic book to be replaced with an advertising phrase on an advertisement or a position in the text of the electronic book into which the advertising phrase is inserted instead of an original phrase; a means for acquiring the stored content of an advertising phrase storage means, wherein the advertising phrase storage means stores the advertising phrase such that the advertising phrase is associated with the replacement target phrase or the tag, in a case where the electronic book stored in the electronic book storage means is the electronic book where the tag indicating the replacement target phrase is set in the text, and the advertising phrase storage means stores the advertising phrase such that the advertising phrase is associated with the tag, in a case where the electronic book stored in the electronic book storage means is the electronic book where the tag indicating the position is set in the text; an advertising phrase insertion means for inserting the advertising phrase into the text of the electronic book based on the tag included in the text of the electronic book and the stored content of the advertising phrase storage means; and an electronic book transmission means for transmitting the electronic book into which the advertising phrase has been inserted by the advertising phrase insertion means to the terminal device.

A computer-readable information storage medium according to the present invention is a computer-readable information storage medium that stores the above program.

A terminal device according to the present invention is a terminal device that is capable of communicating with an electronic book distribution device for distributing an electronic book, the terminal device including: an electronic book reception means for receiving, from the electronic book distribution device, an electronic book in which a tag is set in a text of the electronic book, the tag indicating a replacement target phrase in the text of the electronic book to be replaced with an advertising phrase on an advertisement; a correspondence relationship information reception means for receiving, from the electronic book distribution device, correspondence relationship information on a correspondence relationship between the replacement target phrase or the tag and the advertising phrase; an advertising phrase insertion means for inserting the advertising phrase into the text of the electronic book based on the tag included in the text of the electronic book and the correspondence relationship information; and an output control means for causing output means to output the electronic book into which the advertising phrase has been inserted by the advertising phrase insertion means.

A method of controlling a terminal device according to the present invention is a method of controlling a terminal device that is capable of communicating with an electronic book distribution device for distributing an electronic book, the method including: an electronic book reception step of receiving, from the electronic book distribution device, an electronic book in which a tag is set in a text of the electronic book, the tag indicating a replacement target phrase in the text of the electronic book to be replaced with an advertising phrase on an advertisement; a correspondence relationship information reception step of receiving, from the electronic book distribution device, correspondence relationship information on a correspondence relationship between the replacement target phrase or the tag and the advertising phrase; an advertising phrase insertion step of inserting the advertising phrase into the text of the electronic book based on the tag included in the text of the electronic book and the correspondence relationship information; and an output control step of causing output means to output the electronic book into which the advertising phrase has been inserted by the advertising phrase insertion step.

A program according to the present invention is a program that causes a computer to function as a terminal device that is capable of communicating with an electronic book distribution device for distributing an electronic book, the program causing the computer to function as: an electronic book reception means for receiving, from the electronic book distribution device, an electronic book in which a tag is set in a text of the electronic book, the tag indicating a replacement target phrase in the text of the electronic book to be replaced with an advertising phrase on an advertisement; a correspondence relationship information reception means for receiving, from the electronic book distribution device, correspondence relationship information on a correspondence relationship between the replacement target phrase or the tag and the advertising phrase; an advertising phrase insertion means for inserting the advertising phrase into the text of the electronic book based on the tag included in the text of the electronic book and the correspondence relationship information; and an output control means for causing output means to output the electronic book into which the advertising phrase has been inserted by the advertising phrase insertion means.

A computer-readable information storage medium according to the present invention is a computer-readable information storage medium that stores the above program.

A terminal device according to the present invention is a terminal device that is capable of communicating with an electronic book distribution device for distributing an electronic book, the terminal device including: an electronic book reception means for receiving, from the electronic book distribution device, an electronic book where a tag is set in a text of the electronic book, the tag indicating a position in the text of the electronic book into which an advertising phrase on an advertisement is inserted instead of an original phrase; a correspondence relationship information reception means for receiving, from the electronic book distribution device, correspondence relationship information on a correspondence relationship between the tag and the advertising phrase; an advertising phrase insertion means for inserting the advertising phrase into the text of the electronic book based on the tag included in the text of the electronic book and the correspondence relationship information; and an output control means for causing output means to output the electronic book into which the advertising phrase has been inserted by the advertising phrase insertion means.

A method of controlling a terminal device according to the present invention is a method of controlling a terminal device that is capable of communicating with an electronic book distribution device for distributing an electronic book, the method including: an electronic book reception step of receiving, from the electronic book distribution device, an electronic book where a tag is set in a text of the electronic book, the tag indicating a position in the text of the electronic book into which an advertising phrase on an advertisement is inserted instead of an original phrase; a correspondence relationship information reception step of receiving, from the electronic book distribution device, correspondence relationship information on a correspondence relationship between the tag and the advertising phrase; an advertising phrase insertion step of inserting the advertising phrase into the text of the electronic book based on the tag included in the text of the electronic book and the correspondence relationship information; and an output control step of causing output means to output the electronic book into which the advertising phrase has been inserted by the advertising phrase insertion step.

A program according to the present invention is a program that causes a computer to function as a terminal device that is capable of communicating with an electronic book distribution device for distributing an electronic book, the program causing the computer to function as: an electronic book reception means for receiving, from the electronic book distribution device, an electronic book where a tag is set in a text of the electronic book, the tag indicating a position in the text of the electronic book into which an advertising phrase on an advertisement is inserted instead of an original phrase; a correspondence relationship information reception means for receiving, from the electronic book distribution device, correspondence relationship information on a correspondence relationship between the tag and the advertising phrase; an advertising phrase insertion means for inserting the advertising phrase into the text of the electronic book based on the tag included in the text of the electronic book and the correspondence relationship information; and an output control means for causing output means to output the electronic book into which the advertising phrase has been inserted by the advertising phrase insertion means.

A computer-readable information storage medium according to the present invention is a computer-readable information storage medium that stores the above program.

In one aspect of the present invention, the electronic book stored in the electronic book storage means may be the electronic book where the tag indicating the replacement target phrase is set in the text, the advertising phrase storage means may store the advertising phrase such that the advertising phrase is associated with the replacement target phrase or the tag, and the advertising phrase insertion means may insert the advertising phrase into the text of the electronic book by replacing the replacement target phrase in the text of the electronic book indicated by the tag with the advertising phrase corresponding to the replacement target phrase or the tag.

In one aspect of the present invention, the advertising phrase storage means may store the advertising phrase such that the advertising phrase is associated with the replacement target phrase, and the advertising phrase insertion means may insert the advertising phrase into the text of the electronic book by replacing the replacement target phrase in the text of the electronic book indicated by the tag with the advertising phrase corresponding to the replacement target phrase.

In one aspect of the present invention, the advertising phrase storage means may store the advertising phrase such that the advertising phrase is associated with the tag, and the advertising phrase insertion means may insert the advertising phrase into the text of the electronic book by replacing the replacement target phrase in the text of the electronic book indicated by the tag with the advertising phrase corresponding to the tag.

In one aspect of the present invention, the electronic book stored in the electronic book storage means may be the electronic book where the tag indicating the position is set in the text, the advertising phrase storage means may store the advertising phrase such that the advertising phrase is associated with the tag, and the advertising phrase insertion means may insert the advertising phrase corresponding to the tag into the position in the text of the electronic book indicated by the tag.

In one aspect of the present invention, the advertising phrase insertion means may be included in the distribution system, the distribution system may further include electronic book transmission means for transmitting, to the terminal device, the electronic book into which the advertising phrase has been inserted by the advertising phrase insertion means, the terminal device may further include electronic book reception means for receiving the electronic book transmitted by the electronic book transmission means, and the output control means may cause the output means to output the electronic book into which the advertising phrase has been inserted by the advertising phrase insertion means, based on the electronic book received by the electronic book reception means.

In one aspect of the present invention, the distribution system may further include an electronic book transmission means for transmitting, to the terminal device, the electronic book acquired by the electronic book acquisition means, and a correspondence relationship transmission means for acquiring correspondence relationship information on a correspondence relationship between the replacement target phrase or the tag and the advertising phrase based on the stored content of the advertising phrase storage means, and transmitting the correspondence relationship information to the terminal device, the terminal device may further include an electronic book reception means for receiving the electronic book transmitted by the electronic book transmission means, and a correspondence relationship information reception means for receiving the correspondence relationship information transmitted by the correspondence relationship information transmission means, the advertising phrase insertion means may be included in the terminal device, and the advertising phrase insertion means may insert the advertising phrase into the text of the electronic book based on the tag included in the text of the electronic book and the correspondence relationship information received by the correspondence relationship information reception means.

In one aspect of the present invention, the terminal device may include means for storing, in a reception electronic book storage means, the electronic book received by the electronic book reception means, the correspondence relationship transmission means may transmit, to the terminal device, the correspondence relationship information obtained by updating the correspondence relationship between the replacement target phrase or the tag and the advertising phrase, in a case where the terminal device accesses the distribution system after the correspondence relationship information is transmitted to the terminal device, and the advertising phrase insertion means may insert the advertising phrase into the text of the electronic book based on the electronic book stored in the reception electronic book storage means and the updated correspondence relationship information, in a case where the correspondence relationship information obtained by updating the correspondence relationship between the replacement target phrase or the tag and the advertising phrase is received.

In one aspect of the present invention, the distribution system may further include an electronic book transmission means for transmitting, to the terminal device, the electronic book acquired by the electronic book acquisition means, and a correspondence relationship transmission means for acquiring correspondence relationship information on a correspondence relationship between the tag and the advertising phrase based on the stored content of the advertising phrase storage means, and transmitting the correspondence relationship information to the terminal device, the terminal device may further include an electronic book reception means for receiving the electronic book transmitted by the electronic book transmission means, and a correspondence relationship information reception means for receiving the correspondence relationship information transmitted by the correspondence relationship information transmission means, the advertising phrase insertion means may be included in the terminal device, and the advertising phrase insertion means may insert the advertising phrase into the text of the electronic book based on the tag included in the text of the electronic book and the correspondence relationship information received by the correspondence relationship information reception means.

In one aspect of the present invention, the terminal device may include means for storing, in a reception electronic book storage means, the electronic book received by the electronic book reception means, the correspondence relationship transmission means may transmit, to the terminal device, the correspondence relationship information obtained by updating the correspondence relationship between the tag and the advertising phrase, in a case where the terminal device accesses the distribution system after the correspondence relationship information is transmitted to the terminal device, and the advertising phrase insertion means may insert the advertising phrase into the text of the electronic book based on the electronic book stored in the reception electronic book storage means and the updated correspondence relationship information, in a case where the correspondence relationship information obtained by updating the correspondence relationship between the tag and the advertising phrase is received.

In one aspect of the present invention, the distribution system may include advertisement billing means for calculating a billing amount for an advertiser based on a number of times an electronic book including an advertising phrase associated with the advertiser is transmitted by the electronic book transmission means.

In one aspect of the present invention, the distribution system includes advertisement billing means for calculating a billing amount for an advertiser based on a number of times the correspondence relationship information in which an advertising phrase associated with the advertiser is associated with any of the replacement target phrase, or the tag is transmitted by the correspondence relationship information transmission means.

In one aspect of the present invention, the distribution system may include advertisement billing means for calculating a billing amount for an advertiser based on a number of times the correspondence relationship information in which an advertising phrase associated with the advertiser is associated with any tag is transmitted by the correspondence relationship information transmission means.

In one aspect of the present invention, the distribution system may include advertisement billing means for calculating a billing amount for an advertiser based on a number of advertising phrases associated with the advertiser inserted into the electronic book.

In one aspect of the present invention, the terminal device may include a transmission means for transmitting, to the distribution system, information on a number of times the advertising phrase is output, and the distribution system may include a reception means for receiving the information transmitted by the transmission means, and an advertisement billing means for calculating a billing amount for an advertiser based on the number of times the advertising phrase associated with the advertiser is output, indicated by the information received by the reception means.

In one aspect of the present invention, the distribution system may include advertisement billing means for calculating a billing amount for an advertiser based on a position in the text of the electronic book into which the advertising phrase associated with the advertiser is inserted.

In one aspect of the present invention, the advertisement billing means may include a means for acquiring the stored content of means for storing information on the billing amount for the advertiser such that the information is associated with a part of the text of the electronic book; and a means for calculating the billing amount for the advertiser based on the information associated with a part including the position into which the advertising phrase associated with the advertiser is inserted.

In one aspect of the present invention, the advertisement billing means may calculate the billing amount for the advertiser based on a distance between the position into which the advertising phrase associated with the advertiser is inserted and a position into which another advertising phrase is inserted.

In one aspect of the present invention, the advertisement billing means may calculate the billing amount for the advertiser based on a result of a comparison between a number of advertising phrases associated with the advertiser inserted into a predetermined number of pages of the electronic book and a number of advertising phrases other than the advertising phrases into the predetermined number of pages of the electronic book.

In one aspect of the present invention, the distribution system may include sales price determination means for determining a sales price for the electronic book based on a billing amount for an advertiser produced by insertion of the advertising phrase into the text of the electronic book.

In one aspect of the present invention, the distribution system may include a point storage means for storing point information such that the point information is associated with user identification information for identifying each user, wherein the point information indicate how may points are possessed by the user, and the points can be used as a currency when the electronic book is purchased, and a point information update means for updating the point information stored to be associated with the identification information of the user that is provided with the electronic book such that the points possessed by the user are increased, based on the billing amount for the advertiser produced by insertion of the advertising phrase into the electronic book.

In one aspect of the present invention, the terminal device may include display means that is capable of displaying a plurality of lines in the electronic book, the output control means may display the electronic book on the display means while a new line is started according to a number of characters per line on the display means, and the output control means may comprise means for preventing a new line from being started halfway through the advertising phrase and starting a new line before the advertising phrase.

In one aspect of the present invention, the terminal device may include display means that is capable of displaying a plurality of lines in the electronic book, the output control means may display the electronic book on the display means while a new line is started according to a number of characters per line on the display means and the advertising phrase insertion means may include a prediction means for predicting whether or not a new line is started halfway through the advertising phrase when the electronic book into which the advertising phrase has been inserted is displayed on the display means, and a means for preventing the insertion of the advertising phrase based on a result of the prediction by the prediction means.

Advantageous Effects of Invention

According to the present invention, it is possible to make advertisements easily recognized by a user.

BRIEF DESCRIPTION OF DRAWINGS

FIG. 5 A diagram showing an example of electronic book data;

FIG. 6 A diagram showing an example of an advertising phrase table;

FIG. 7 A diagram showing another example of the electronic book data;

FIG. 8 A diagram showing another example of the advertising phrase table;

FIG. 9 A diagram showing another example of the electronic book data;

FIG. 10 A diagram showing another example of the advertising phrase table;

FIG. 15 A diagram showing an example of a distribution history table;

FIG. 16 A diagram showing another example of the correspondence relationship table;

FIG. 19 A diagram showing another example of the electronic book data into which advertising phrases are inserted;

FIG. 20 A diagram showing an example of information on a correspondence relationship between part of the electronic book and a billing amount;

FIG. 21 A diagram showing an example of information on a correspondence relationship between the distance between the advertising phrases and the billing amount;

FIG. 22 A diagram showing an example of information on a correspondence relationship between an occupancy of the advertising phrases and the billing amount;

FIG. 23 A diagram showing an example of information on a correspondence relationship between the billing amount and a discount amount;

FIG. 24 A diagram showing an example of a point table;

FIG. 25 A diagram showing an example of information on a correspondence relationship between the billing amount and a point;

DESCRIPTION OF EMBODIMENTS

Examples of the embodiment of the present invention will be described in detail below with reference to accompanying drawings.

First Embodiment

Figure 1:
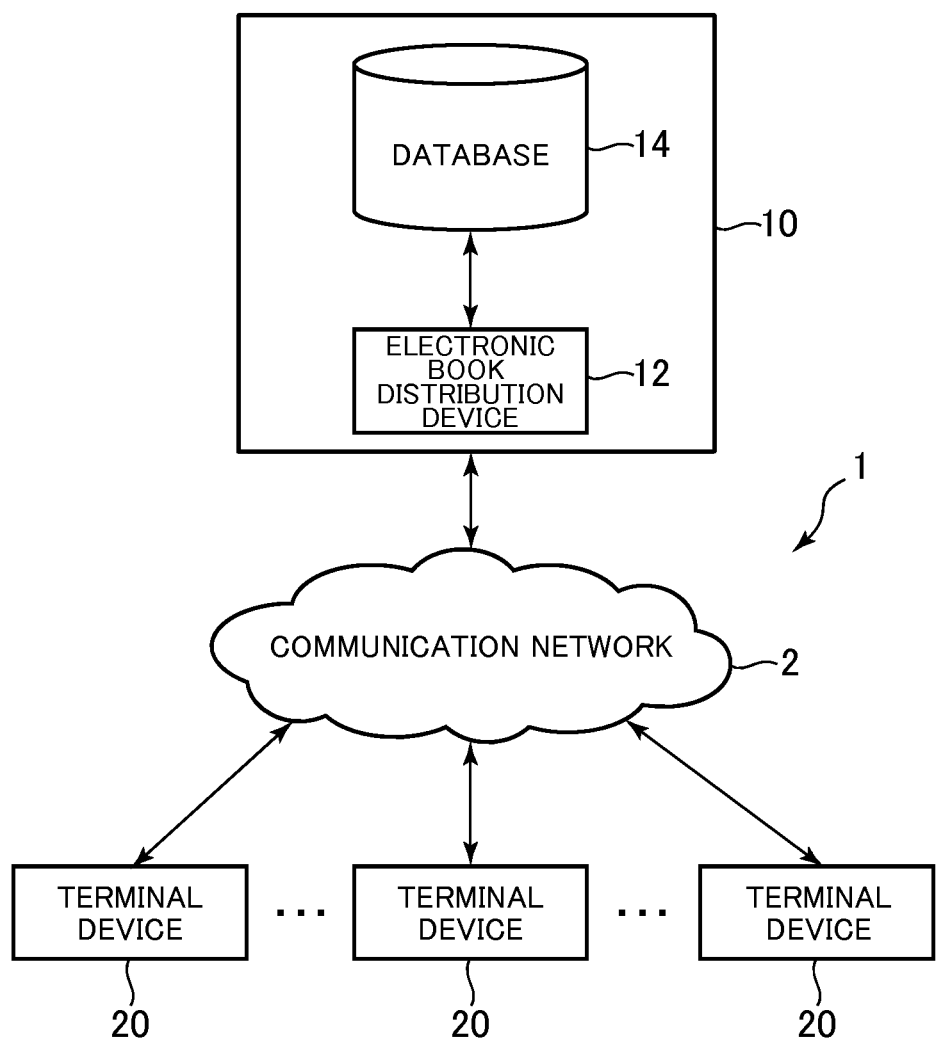
FIG. 1 A diagram showing the overall configuration of an electronic book provision system according to an embodiment of the present invention.

FIG. 1 shows the overall configuration of an electronic book provision system according to a first embodiment of the present invention. As shown in FIG. 1, the electronic book provision system 1 according to the first embodiment includes a distribution system 10 and a plurality of terminal devices 20. The distribution system 10 and the terminal devices 20 are connected to, for example, a communication network 2 including the Internet and the like, and can perform data communication with each other.

The distribution system 10 is a system that distributes an electronic book to a terminal device 20. The distribution system 10 also performs billing processing on the advertiser of an advertisement made through the electronic book. The distribution system 10 includes one or a plurality of servers. In the example shown in FIG. 1, the distribution system 10 includes an electronic book distribution device 12 and a database 14.

The electronic book distribution device 12 is realized by a server computer. For example, the electronic book distribution device 12 includes a control unit (for example, a CPU), a main memory unit (for example, a RAM), an auxiliary storage unit (for example, a hard disk drive or a solid-state drive), an optical disc drive and a communication interface.

The control unit performs processing according to a program stored in the auxiliary storage unit. For example, the program and data are supplied to the auxiliary storage unit through an optical disc (information storage medium). Specifically, the optical disc in which the program and the data are stored is fitted into the optical disc drive, and the program and the data stored in the optical disc are read by the optical disc drive and are stored in the auxiliary storage unit. The program and the data may be supplied to the auxiliary storage unit through an information storage medium (for example, a memory card) other than the optical disc. The program and the data may be supplied to the auxiliary storage unit through the communication network 2.

The electronic book distribution device 12 can access the database 14. For example, the database 14 stores data shown below:

Data on a user utilizing the electronic book provision system 1;

Data on an electronic book provided by the electronic book provision system 1;

Data on the distribution history of the electronic book performed in the electronic book provision system 1; and Data on the advertiser of an advertisement performed in the electronic book provision system 1.

The terminal device 20 is an information processing device that the user uses to enjoy the electronic book. For example, the terminal device 20 is a dedicated terminal device for reading the electronic book. The terminal device 20 may be a mobile telephone, a portable information terminal, a portable game machine, a personal computer or the like.

For example, the terminal device 20 includes a control unit (for example, a CPU), a main memory unit (for example, a RAM), an auxiliary storage unit (for example, a hard disk drive or a solid-state drive), a memory card slot, an operation unit, a display unit (for example, a liquid crystal display), a sound output unit (for example, a speaker) and a communication interface.

The control unit performs processing according to a program stored in the auxiliary storage unit. In the case of the present embodiment, a program (viewer program) for displaying the electronic book on the display unit is stored in the auxiliary storage unit. A program for outputting the electronic book from the sound output unit may be stored in the auxiliary storage unit.

The program and the data are supplied to the auxiliary storage unit through a memory card (information storage medium). Specifically, the memory card in which the program and the data are stored is fitted into the memory card slot, and the program and the data stored in the memory card are read by the memory card slot and are stored in the auxiliary storage unit. The program and the data may be supplied to the auxiliary storage unit through an information storage medium (for example, an optical disc) other than the memory card. The program and the data may be supplied to the auxiliary storage unit through the communication network 2.

The operation unit is a unit with which the user performs the operation. For example, the operation unit is a stick, a button, a mouse, a touch panel provided on the display unit or the like.

In the electronic book provision system 1 described above, the user can purchase the electronic book and enjoy the purchased electronic book with the terminal device 20. The user who wants to purchase the electronic book accesses the distribution system 10 through the terminal device 20. For example, the user inputs a user ID or a password to log in to the distribution system 10, and thereafter looks for a desired electronic book by searching the electronic book or selecting the category of the electronic book.

The user who has found the desired electronic book performs a purchasing procedure on a purchasing screen (not shown) for purchasing the electronic book. When the purchasing procedure of the electronic book is completed, the electronic book can be downloaded to the terminal device 20. When the user performs an operation of instructing to download it, the electronic book is read from the database 14, and the electronic book is transmitted to the terminal device 20.

In the terminal device 20 receiving the electronic book, the electronic book is displayed on the display unit, and the user can read the electronic book. In the terminal device 20, the electronic book may be output from the sound output unit. In other words, the user may be able to listen to sound by reading the electronic book aloud.

In the electronic book provision system 1, an advertisement is inserted into the text of the electronic book (for example, a novel). This adverting function will be described below.

Figure 2:
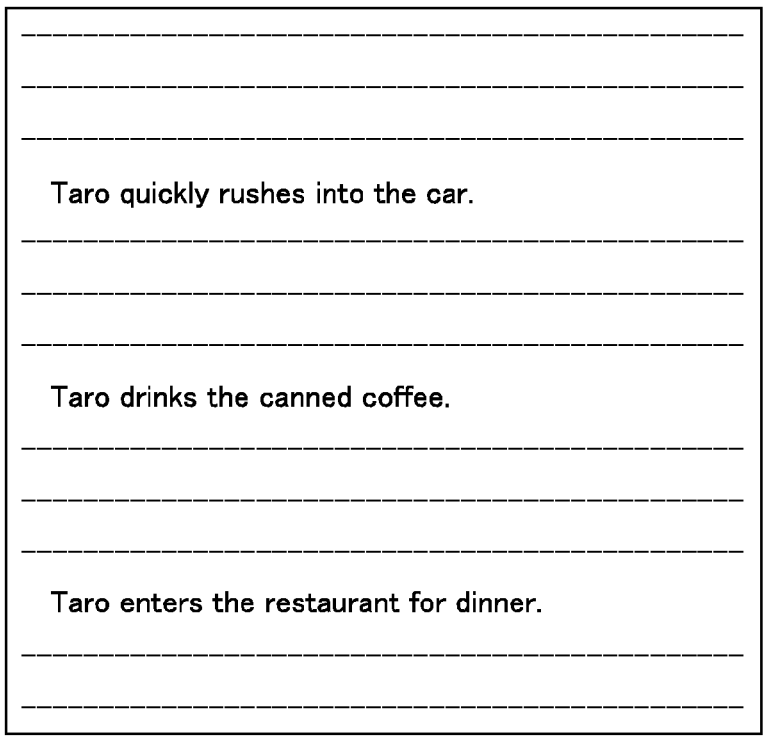
FIG. 2 A diagram showing an example of the original text of an electronic book.
Figure 3:
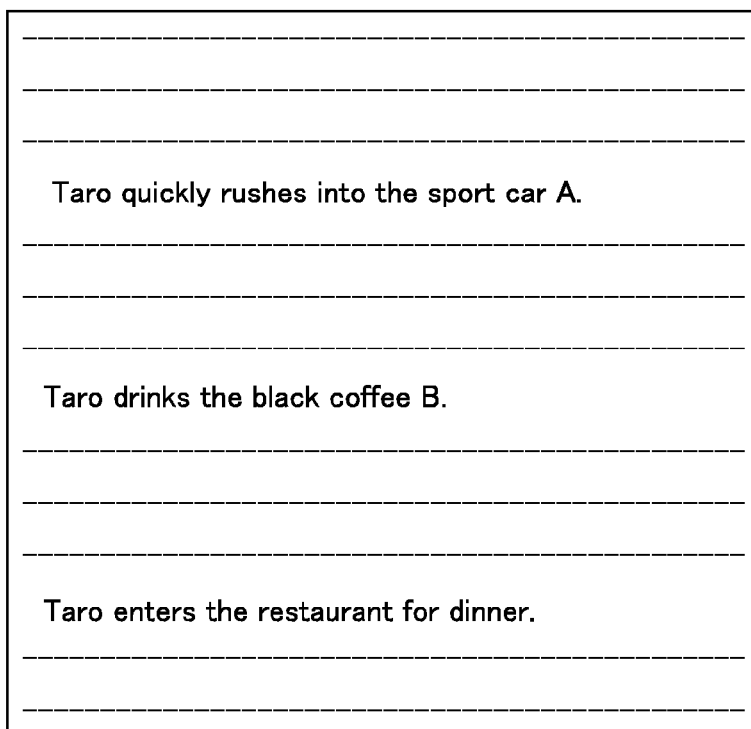
FIG. 3 A diagram showing an example of the electronic book displayed on the display unit of a terminal device.

FIGS. 2 and 3 are diagrams for illustrating the outline of the advertising function described above. FIG. 2 shows an example of the original text of the electronic book (novel). In the example shown in FIG. 2, a sentence "Taro quickly rushes into the car", a sentence "Taro drinks the canned coffee" and a sentence "Taro enters the restaurant for dinner" are included in the original text of the electronic book.

FIG. 3 shows an example of the text of the electronic book displayed on the display unit of the terminal device 20. As shown in FIG. 3, in the text of the electronic book displayed on the display unit of the terminal device 20, the "car" is replaced with the "sport car A", and the "canned coffee" is replaced with the "black coffee B." The "sport car A" refers to the product name of an automobile that is actually sold, and the "black coffee B" refers to the product name of a canned coffee that is actually sold.

As described above, in the electronic book provision system 1, a common noun included in the original text of the electronic book is replaced with the name of the product that is actually sold, as a result, the name of the product actually sold is embedded in the text of the electronic book. According to the electronic book provision system 1, when a user reads the electronic book (for example, a novel), the user inevitably notices the advertisement (the product name).

In the case of the example shown in FIG. 3, not all the phrases "car" included in the text of the electronic book are replaced with the "sport car A", and only portions previously specified by the author of the electronic book or the like are replaced with the "sport car A." In other words, only the portions that the author or the like determines to replace with the car name which is actually sold are replaced with the "sport car A." The same is true for the "canned coffee." In this way, it is ensured that, even if replacement into the name of the actually sold product such as the "sport car A" or the "black coffee B" is performed, the content of the electronic book is prevented from being inconsistent.

Although in the example shown in FIG. 3, the case where the name of the actually sold product is inserted into the text of the electronic book has been described, the name of a service actually provided may be inserted into the text of the electronic book. Not only the product name and the service name but also the name of an existing company and the catchphrase of an existing product or service may be inserted into the text of the electronic book.

A configuration for realizing the advertisement function described above will be described below. In the following description, phrases such as the "sport car A" and the "black coffee B" described above are referred to as "advertising phrases." In other words, a phrase which is inserted instead of the original phrase and which are related to advertisement (for example, the product name or service name) is referred to as the "advertising phrase."

Figure 4:
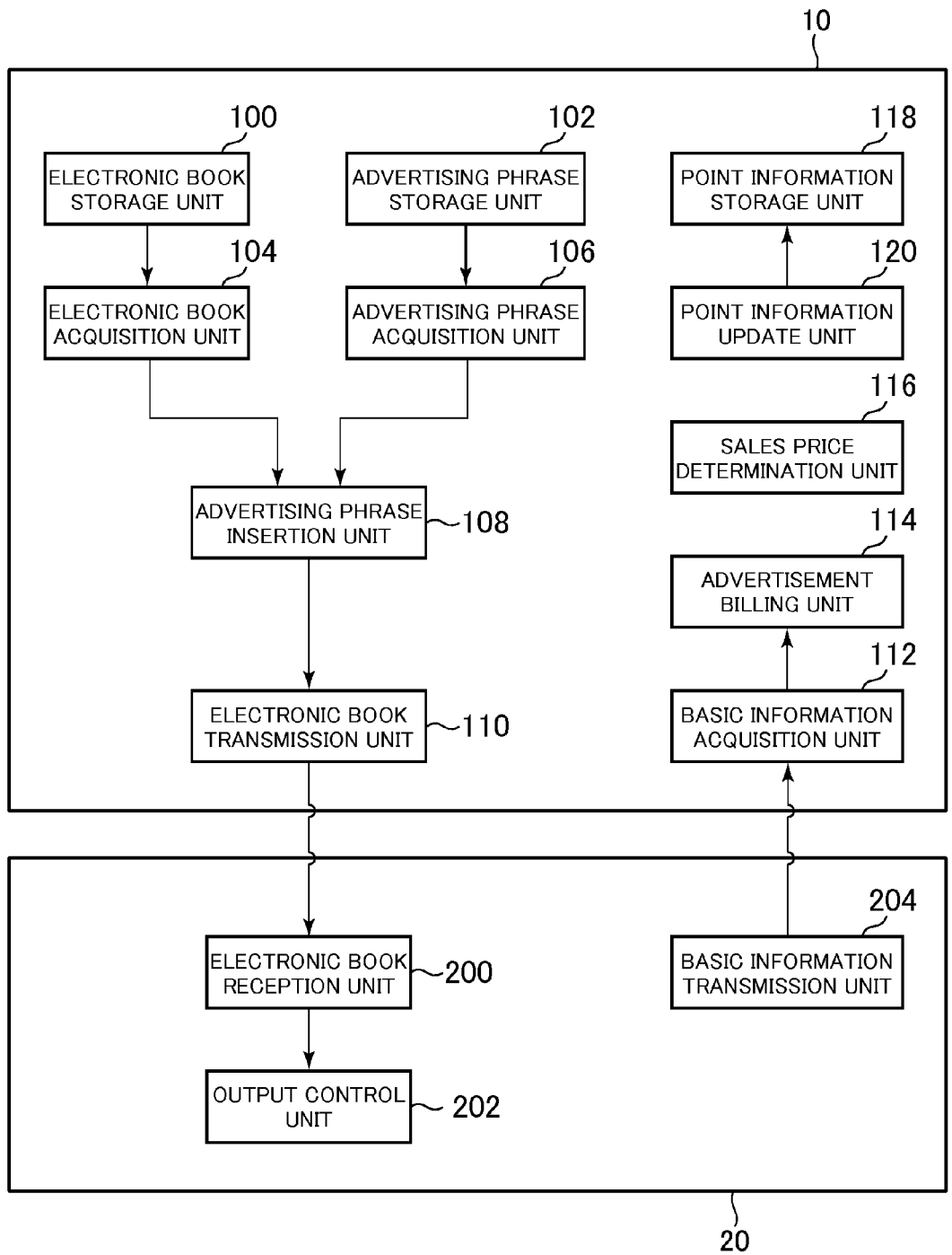
FIG. 4 A functional block diagram of the electronic book provision system according to a first embodiment.

FIG. 4 is a functional block diagram showing functional blocks related to the present invention among functional blocks realized by the electronic book provision system 1. As shown in FIG. 4, the electronic book provision system 1 includes an electronic book storage unit 100, an advertising phrase storage unit 102, an electronic book acquisition unit 104, an advertising phrase acquisition unit 106, an advertising phrase insertion unit 108, an electronic book transmission unit 110, an electronic book reception unit 200 and an output control unit 202. These functional blocks are functional blocks for providing the user with the electronic book having advertising phrases inserted. The electronic book provision system 1 includes functional blocks other than these functional blocks, the functional blocks other than the functional blocks described above will be described later.

The electronic book storage unit 100 and the advertising phrase storage unit 102 will be described. The electronic book storage unit 100 and the advertising phrase storage unit 102 are realized in the distribution system 10. For example, the electronic book storage unit 100 and the advertising phrase storage unit 102 are realized by the database 14.

The electronic book storage unit 100 stores one or a plurality of electronic books. FIG. 5 shows an example of electronic book data. The electronic book data shown in FIG. 5 is data that indicates the original text (sentences) of the electronic book. In the electronic book data shown in FIG. 5, a tag indicating a replacement target phrase in the original text of the electronic book is embedded in the original text of the electronic book. The "replacement target phrase" refers to a phrase that needs to be replaced by an advertising phrase.

In the case of the example shown in FIG. 5, a combination of <ad> and </ad> corresponds to the "tag" described above. The phrase sandwiched between <ad> and </ad> corresponds to the "replacement target phrase" described above. In other words, the "car", the "canned coffee" and the "restaurant" correspond to the "replacement target phrases." As described above, which phrase is set to the replacement target phrase is determined by the author of the electronic book or the like.

The advertising phrase storage unit 102 stores the advertising phrase such that the advertising phrase is associated with the replacement target phrase or the tag. FIG. 6 shows an example of an advertising phrase table stored in the advertising phrase storage unit 102. The advertising phrase table shown in FIG. 6 includes "replacement target phrase", "advertising phrase" and "advertiser ID" fields. The "replacement target phrase" field indicates the replacement target phrase (that is, the phrase which need to be replaced by the advertising phrase). The "advertising phrase" field indicates the advertising phrase (that is, the phrase on the advertisement). The candidate of the advertising phrase that need to be inserted instead of the replacement target phrase is registered in the "advertising phrase" field.

The "advertiser ID" field indicates identification information on the advertiser. In the case of the example shown in FIG. 6, the advertiser of the advertising phrase "sport car A" is the "company X." The advertiser of the advertising phrase "black coffee B" is the "company Y." Likewise, the advertiser of the advertising phrase "cafe au lait C" is the "company Z."

In the case of the example shown in FIG. 6, the "sport car A" that is the name of an automobile sold by the company X is associated, as the advertising phrase, with a replacement string "car."

In the case of the example shown in FIG. 6, two advertising phrases, that is, "black coffee B" that is the name of a canned coffee sold by the company Y and "cafe au lait C" that is the name of a canned coffee sold by the company Z, are associated with one replacement target phrase, that is, the "canned coffee." As described above, when a plurality of companies want the advertisement of the same product class, a plurality of advertising phrases are associated with one replacement target phrase.

In the case of the example shown in FIG. 6, no advertising phrase is associated with the replacement target phrase "restaurant." This indicates that there is no company that wants the advertisement of a restaurant through the electronic book. As described above, when there is no company that wants an advertisement, no advertising phrase is associated with a replacement target phrase.

The electronic book data and the advertising phrase table are not limited to the examples shown in FIGS. 5 and 6. FIG. 7 shows another example of the electronic book data. Even in the electronic book data shown in FIG. 7, as in the electronic book data shown in FIG. 5, a tag indicating the replacement target phrase in the original text (sentences) of the electronic book is embedded in the original text of the electronic book. However, in the electronic book data shown in FIG. 7, the tags differ depending on the type of replacement target phrase, and the tag itself functions as identification information for identifying the replacement target phrase.

In the example shown in FIG. 7, a combination of <car> and </car> is embedded as the "tag" described above. The combination of <car> and </car> corresponds to the replacement string "car." In the example shown in FIG. 7, a combination of <coffee> and </coffee> is also embedded as the "tag" described above. The combination of <coffee> and </coffee> corresponds to the replacement string "canned coffee." In the example shown in FIG. 7, a combination of <restaurant> and </restaurant> is also embedded as the "tag" described above. The combination of <restaurant> and </restaurant> corresponds to the replacement string "restaurant."

FIG. 8 shows an example of an advertising phrase table when the electronic book data is the data shown in FIG. 7. The advertising phrase table shown in FIG. 8 includes "tag", "advertising phrase" and "advertiser ID" fields. The advertising phrase table shown in FIG. 8 differs from the advertising phrase table shown in FIG. 6 in that it includes the "tag" field instead of the "replacement target phrase" field.

In the example shown in FIG. 8, the "sport car A" that is the name of an automobile sold by the company X is associated, as the advertising phrase, with the combination of <car> and </car>. Two advertising phrases, that is, the "black coffee B" that is the name of a canned coffee sold by the company Y and the "cafe au lait C" that is the name of a canned coffee sold by the company Z, are associated with the combination of <coffee> and </coffee>. No advertising phrase is associated with the combination of <restaurant> and </restaurant>.

FIG. 9 shows yet another example of the electronic book data. In the electronic book data shown in FIG. 9, a tag indicating a position in the text (sentences) of the electronic book where the advertising phrase needs to be inserted instead of the original phrase is embedded in the text. In the electronic book data shown in FIG. 9, the phrase (that is, the phrase corresponding to the replacement target phrase shown in FIGS. 5 and 7) itself that needs to be replaced by the advertising phrase is replaced by the tag. In the case of the example shown in FIG. 9, the tags of <car>, <coffee> and <restaurant> are set.

FIG. 10 shows an example of an advertising phrase table when the electronic book data is the data shown in FIG. 9. The advertising phrase table shown in FIG. 10 includes "tag", "original phrase", "advertising phrase" and "advertiser ID" fields. The advertising phrase table shown in FIG. 10 differs from the advertising phrase table shown in FIG. 6 in that it includes the "tag" and "original phrase" fields instead of the "replacement target phrase" field.

The "original phrase" field indicates the phrase in the position indicated by the tag in the original text of the electronic book. In other words, the "original phrase" field indicates the phrase that needs to be displayed in the position indicated by the tag when the original text of the electronic book are displayed. In this case, the "advertising phrase" field indicates the advertising phrase that needs to be inserted into the position indicated by the tag.

In the example shown in FIG. 10, the phrase "car" is associated, as the original phase, with <car>. The "sport car A" that is the name of an automobile sold by the company X is associated, as the advertising phrase, with <car>. The phrase "canned coffee" is associated, as the original phase, with <coffee>, and two advertising phrases, that is, the "black coffee B" that is the name of a canned coffee sold by the company Y and the "cafe au lait C" that is the name of a canned coffee sold by the company Z, are associated with <coffee>. The phrase "restaurant" is associated, as the original phase, with <restaurant>. No advertising phrase is associated with <restaurant>.

The electronic book acquisition unit 104, the advertising phrase acquisition unit 106, the advertising phrase insertion unit 108 and the electronic book transmission unit 110 will be described. These functional blocks are realized in the distribution system 10. For example, these functional blocks are realized by the electronic book distribution device 12.

The electronic book acquisition unit 104 acquires the electronic book stored in the electronic book storage unit 100. The advertising phrase acquisition unit 106 acquires the stored content of the advertising phrase storage unit 102.

The advertising phrase insertion unit 108 inserts the advertising phrase into the text (sentences) of the electronic book based on the tag included in the text of the electronic book and the stored content of the advertising phrase storage unit 102.

For example, when the electronic book data and the advertising phrase table are the data and the table as shown in FIGS. 5 and 6, the advertising phrase insertion unit 108 replaces the replacement target phrase in the text of the electronic book indicated by the tag with the advertising phrase corresponding to the replacement target phrase, and thereby inserts the advertising phrase into the text of the electronic book.

For example, the advertising phrase insertion unit 108 replaces the replacement target phrase "car" with the advertising phrase "sport car A." The advertising phrase insertion unit 108 also replaces the replacement target phrase "canned coffee" with the advertising phrase "black coffee B" or "cafe au lait C."

When a plurality of advertising phrases are associated with one replacement target phrase, the advertising phrase insertion unit 108 selects any one of those advertising phrases. For example, the advertising phrase insertion unit 108 selects any one of those advertising phrases based on an advertisement fee paid by each advertiser of those advertising phrases. For example, the advertising phrase insertion unit 108 selects the advertising phrase of the advertiser who pays the highest advertising fee. Alternatively, the advertising phrase insertion unit 108 may select any one of those advertising phrases according to probability information set based on the adverting fee paid by each advertiser of those advertising phrases. In this case, the probability information is set such that, as the advertising fee paid by an advertiser is increased, the probability that the advertising phrase of such an advertiser is selected is increased.

Alternatively, the advertising phrase insertion unit 108 may randomly select any one of a plurality of advertising phrases. Only one advertising phrase may be associated with one replacement target phrase without fail. Namely, a plurality of advertising phrases may be prevented from being associated with one replacement target phrase.

Incidentally, in the case of the advertising phrase table shown in FIG. 6, no advertising phrase is associated with the replacement target phrase "restaurant." In this case, the advertising phrase insertion unit 108 does not replace the replacement target phrase "restaurant" with the advertising phrase.

For example, when the electronic book data and the advertising phrase table are the data and the table as shown in FIGS. 7 and 8, the advertising phrase insertion unit 108 replaces the replacement target phrase in the text of the electronic book indicated by the tag with the advertising phrase corresponding to the tag, and thereby inserts the advertising phrase into the text of the electronic book.

Specifically, the advertising phrase insertion unit 108 replaces the replacement target phrase "car" sandwiched between <car> and </car> with the advertising phrase "sport car A" corresponding to <car> and </car>. The advertising phrase insertion unit 108 also replaces the replacement target phrase "canned coffee" sandwiched between <coffee> and </coffee> with the advertising phrase "black coffee B" or "cafe au lait C" corresponding to <coffee> and </coffee>. In the case of the advertising phrase table shown in FIG. 8, since no advertising phrase is associated with <restaurant> and </restaurant>, the advertising phrase insertion unit 108 does not replace the replacement target phrase "restaurant" sandwiched between <restaurant> and </restaurant> with the advertising phrase.

For example, when the electronic book data and the advertising phrase table are the data and the table as shown in FIGS. 9 and 10, the advertising phrase insertion unit 108 inserts the advertising phrase corresponding to the tag into the positions in the text of the electronic book indicated by the tag and thereby inserts the advertising phrase into the text of the electronic book.

Specifically, the advertising phrase insertion unit 108 inserts the advertising phrase "sport car A" corresponding to <car> behind <car> (or before <car>). The advertising phrase insertion unit 108 also inserts the advertising phrase "black coffee B" or "cafe au lait C" corresponding to <coffee> behind <coffee> (or before <coffee>). In the case of the advertising phrase table shown in FIG. 10, since no advertising phrase is associated with <restaurant>, the advertising phrase insertion unit 108 inserts the original phrase "restaurant" corresponding to <restaurant> behind <restaurant> (or before <restaurant>).

The electronic book transmission unit 110 transmits, to the terminal device 20, the electronic book into which the advertising phrases have been inserted by the advertising phrase insertion unit 108.

Figure 11:
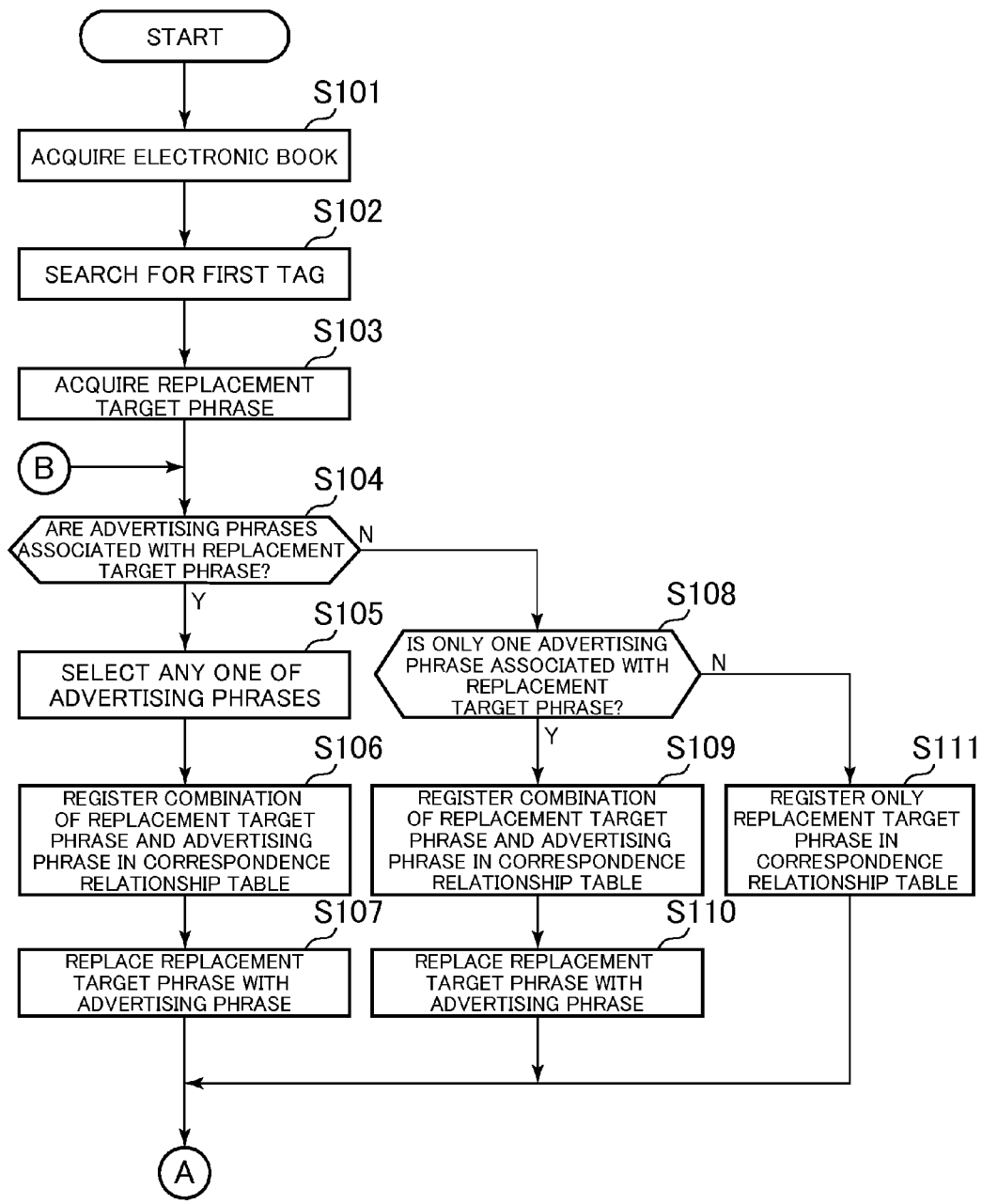
FIG. 11 A flowchart showing an example of processing performed in a distribution system according to the first embodiment.
Figure 12:
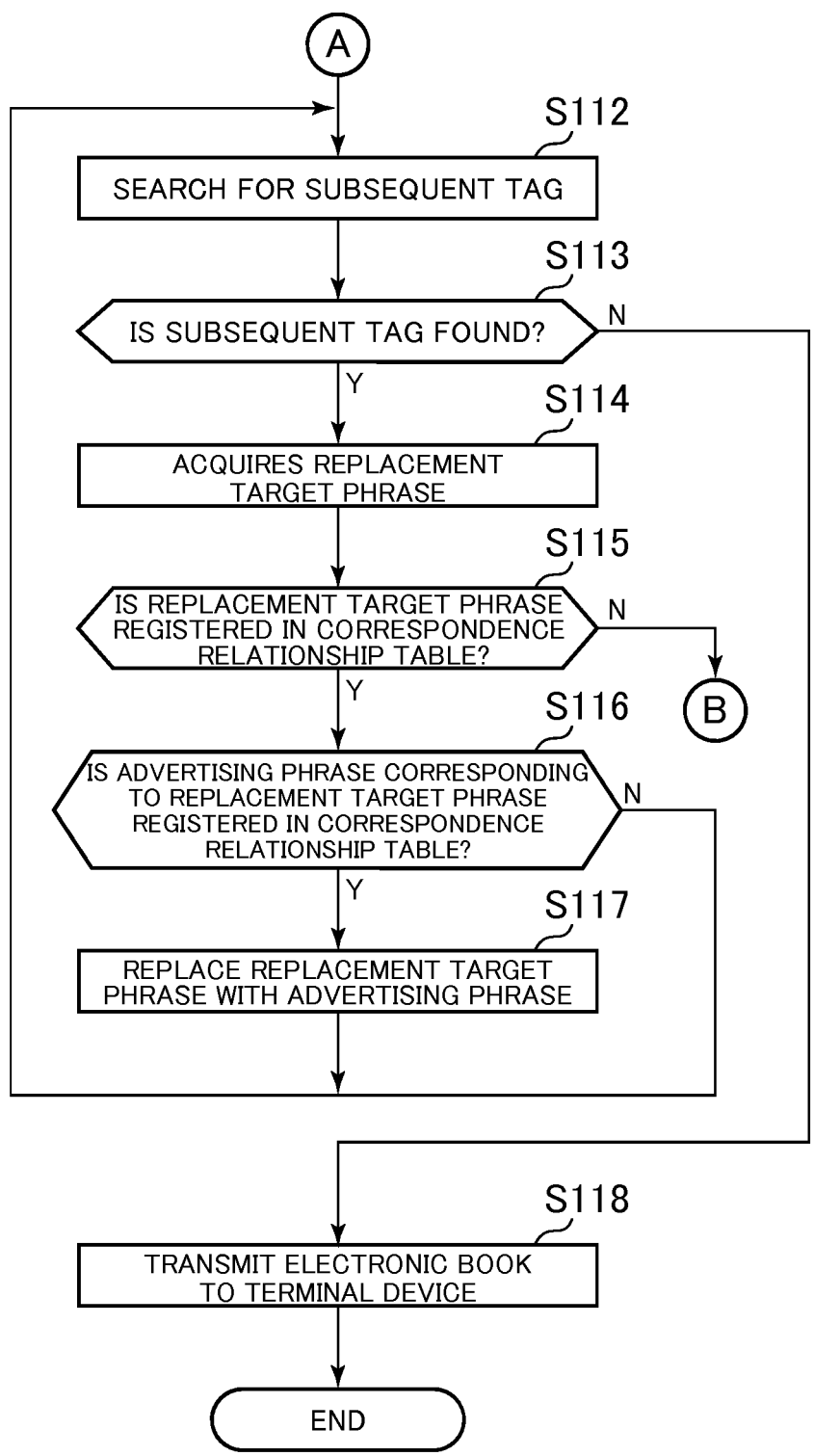
FIG. 12 A flowchart showing the example of the processing performed in the distribution system according to the first embodiment.

Processing that is performed by the distribution system 10 when the purchasing procedure of the electronic book is completed will now be described. FIGS. 11 and 12 are flowcharts showing an example of the processing that is performed by the distribution system 10 when the purchasing procedure of the electronic book is completed. The control unit of the electronic book distribution device 12 performs the processing shown in FIGS. 11 and 12 according to the program stored in the auxiliary storage unit, and thus the control unit functions as the electronic book acquisition unit 104, the advertising phrase acquisition unit 106, the advertising phrase insertion unit 108 and the electronic book transmission unit 110. The processing shown in FIGS. 11 and 12 is processing when the electronic book data and the advertising phrase table are the data and the table as shown in FIGS. 5 and 6.

When the purchasing procedure of the electronic book is completed, as shown in FIG. 11, the control unit (the electronic book acquisition unit 104) of the electronic book distribution device 12 acquires the purchased electronic book from the database 14 (S101). Thereafter, the control unit searches for the first tag embedded in the text of the electronic book (S102). In other words, the control unit searches for the first combination of <ad> and </ad> embedded in the text of the electronic book. When the first tag is found, the control unit acquires the replacement target phrase indicated by the tag (S103). In other words, the control unit acquires, as the replacement target phrase, the phrase sandwiched between <ad> and </ad>.

After the processing of step S103 is performed, the control unit (the advertising phrase acquisition unit 106) references the advertising phrase table (FIG. 6), and determines whether or not a plurality of advertising phrases are associated with the replacement target phrase acquired in step S103 (S104).

When the plurality of advertising phrases are associated with the replacement target phrase, the control unit selects any one of those advertising phrases (S105). For example, the control unit selects any one of those advertising phrases based on an advertisement fee paid by each advertiser of those advertising phrases.

After the processing of step S105 is performed, the control unit registers, in a correspondence relationship table, a combination of the replacement target phrase acquired in step S103 and the advertising phrase selected in step S105 (S106).

Figures 13, 14:
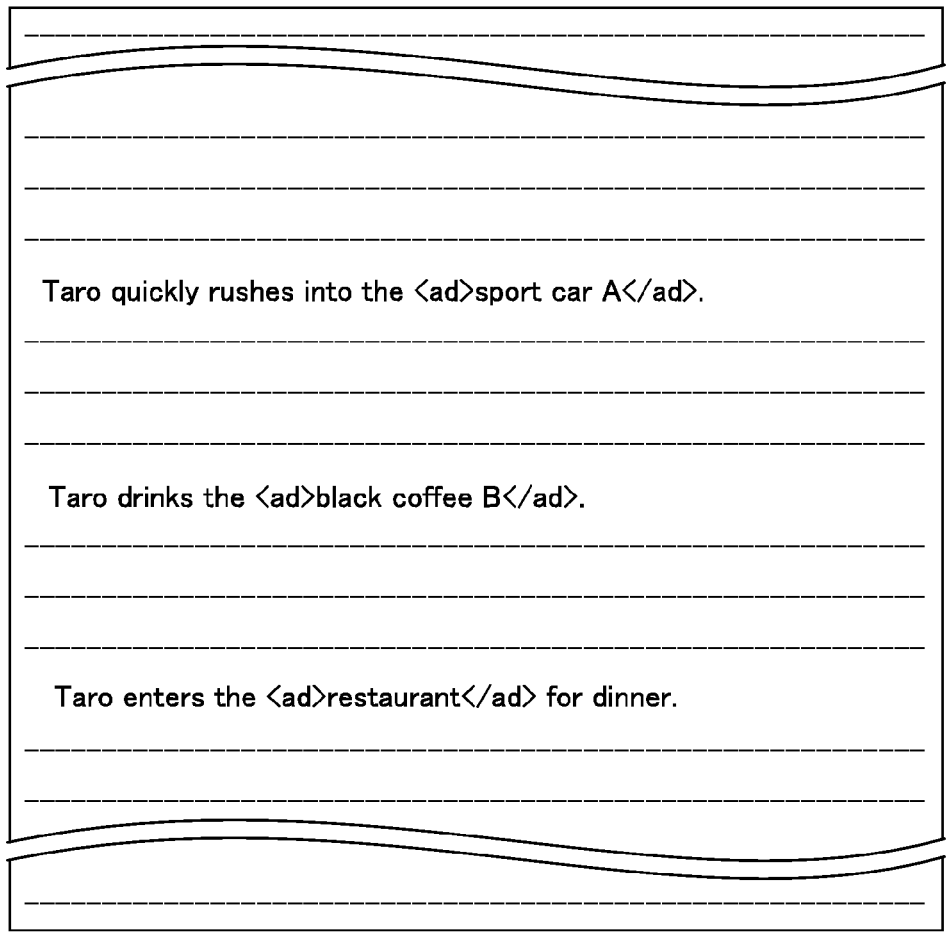
FIG. 13 A diagram showing an example of a correspondence relationship table.
FIG. 14 A diagram showing an example of electronic book data into which advertising phrases are inserted.

FIG. 13 shows an example of the correspondence relationship table. The correspondence relationship table is data showing a correspondence relationship between the replacement target phrase and the advertising phrase, and includes the "replacement target phrase" and "advertising phrase" fields. The correspondence relationship table is stored in the main memory unit. Although in the correspondence relationship table shown in FIG. 13, combinations of replacement target phrases and advertising phrases are registered (that is, records are present), when the execution of the present processing is started, the correspondence relationship table is initialized to a state where no combinations of replacement target phrases and advertising phrases are registered (that is, a state where no records are present).

In step S106, a new record is added to the correspondence relationship table. Then, a replacement target phrase acquired in step S103 and an advertising phrase selected in step S105 are registered in the "replacement target phrase" and "advertising phrase" fields of the newly added record.

After the processing of step S106 is performed, the control unit (the advertising phrase insertion unit 108) replaces, in the electronic book acquired in step S101, the replacement target phrase indicated by the tag found in step S102 with the advertising phrase selected in step S105 (S107). Thereafter, the control unit performs processing of step S112, which will be described later.

On the other hand, in step S104, if it is determined that a plurality of advertising phrases are not associated with the replacement target phrase, the control unit (the advertising phrase acquisition unit 106) references the advertising phrase table (FIG. 6), and determines whether or not only one advertising phrase is associated with the replacement target phrase acquired in step S103 (S108).

If only one advertising phrase is associated with the replacement target phrase, the control unit registers, in the correspondence relationship table (FIG. 13), a combination of the replacement target phrase acquired in step S103 and the one advertising phrase (S109). This processing is the same as that in step S106.

After the processing of step S109 is performed, the control unit (the advertising phrase insertion unit 108) replaces, in the electronic book, the replacement target phrase indicated by the tag found in step S102 with the one advertising phrase described above (S110). Thereafter, the control unit performs the processing of step S112, which will be described later.

The case where it is determined in step S108 that only one advertising phrase is not associated with the replacement target phrase means the case where no advertising phrase is associated with the replacement target phrase. In this case, the control unit registers only the replacement target phrase acquired in step S103 in the correspondence relationship table (FIG. 13) (S111). In this case, a new record is added to the correspondence relationship table. Then, the replacement target phrase acquired in step S103 is registered in the "replacement target phrase" field of the newly added record. The "advertising phrase" field is set blank. Thereafter, the control unit performs the processing of step S112, which will be described later.

As shown in FIG. 12, the control unit searches for the subsequent tag embedded in the text of the electronic book (S112). Then, the control unit determines whether or not the subsequent tag is found (S113). If the subsequent tag is found, the control unit acquires a replacement target phrase indicated by the tag (S114). Furthermore, the control unit determines whether or not the replacement target phrase acquired in step S114 has already been registered in the correspondence relationship table (S115). If the replacement target phrase acquired in step S114 has already been registered in the correspondence relationship table, the control unit references the correspondence relationship table (FIG. 13), and determines whether or not an advertising phrase corresponding to the replacement target phrase acquired in step S114 is registered in the correspondence relationship table (S116).

If the advertising phrase corresponding to the replacement target phrase acquired in step S114 is registered in the correspondence relationship table, the control unit acquires the advertising phrase, and replaces, in the electronic book, the replacement target phrase indicated by the tag found in step S112 with the acquired advertising phrase (S117). Thereafter, the control unit performs the processing of step S112. In other words, the control unit searches for the further subsequent tag.

On the other hand, if the advertising phrase corresponding to the replacement target phrase acquired in step S114 is not registered in the correspondence relationship table, the control unit does not replace the replacement target phrase indicated by the tag found of step S112, and performs the processing of step S112 with the replacement target phrase as it is. In other words, the control unit searches for the further subsequent tag.

If the replacement target phrase acquired in step S114 is not registered in the correspondence relationship table, the control unit performs the processing of step S104. Specifically, the control unit references the advertising phrase table (FIG. 6), and determines whether or not a plurality of advertising phrases are associated with the replacement target phrase acquired in step S114 (S104).

If a plurality of advertising phrases are associated with the replacement target phrase acquired in step S114, the control unit selects any one of those advertising phrases (S105). Thereafter, the control unit registers, in the correspondence relationship table (FIG. 13), a combination of the replacement target phrase acquired in step S114 and the advertising phrase selected in step S105 (S106). Furthermore, the control unit replaces, in the electronic book, the replacement target phrase indicated by the tag found in step S112 with the advertising phrase selected in step S105 (S107). Thereafter, the control unit performs the processing of step S112. In other words, the control unit searches for the further subsequent tag.

On the other hand, if a plurality of advertising phrases are not associated with the replacement target phrase acquired in step S114, the control unit references the advertising phrase table (FIG. 6), and determines whether or not only one advertising phrase is associated with the replacement target phrase acquired in step S114 (S108). Then, if only one advertising phrase is associated with the replacement target phrase acquired in step S114, the control unit registers, in the correspondence relationship table (FIG. 13), a combination of the replacement target phrase acquired in step S114 and the one advertising phrase (S109). The control unit (the advertising phrase insertion unit 108) replaces, in the electronic book, the replacement target phrase indicated by the tag found in step S112 with the one advertising phrase described above (S110). Thereafter, the control unit performs the processing of step S112, which will be described later. In other words, the control unit searches for the further subsequent tag.

The case where it is determined in step S108 that only one advertising phrase is not associated with the replacement target phrase acquired in step S114 means the case where no advertising phrase is associated with the replacement target phrase acquired in step S114. In this case, the control unit registers only the replacement target phrase acquired in step S114 in the correspondence relationship table (FIG. 13) (S111). Thereafter, the control unit performs the processing of step S112. In other words, the control unit searches for the further subsequent tag.

The case where it is determined that the subsequent tag is not found in step S113 means the case where the detection of all the tags embedded in the text of the electronic book is completed. In this case, the electronic book in which the advertising phrase is inserted instead of the replacement target phrase is generated. FIG. 14 shows an example of the electronic book data in this case. In this case, the control unit (the electronic book transmission unit 110) transmits, to the terminal device 20, the electronic book in which the advertising phrase is inserted instead of the replacement target phrase (S118).

In the distribution system 10, a distribution history table on the distribution history of the electronic book is stored in the database 14. FIG. 15 shows an example of the distribution history table. The distribution history table shown in FIG. 15 includes "electronic book ID", "user ID" "distribution date and time" and "advertising phrase information" fields.

The "electronic book ID" field indicates identification information on the distributed electronic book. The "user ID" field indicates identification information on the user who purchases the electronic book. In other words, the "user ID" field indicates identification information on the user related to the terminal device 20 that is the distribution destination of the electronic book. The "distribution date and time" field indicates the date and time when the electronic book is distributed.

Information on the advertising phrases inserted into the electronic book is registered in the "advertising phrase information" field. For example, the following information is registered in the "advertising phrase information" field:

A list of the advertising phrases inserted into the electronic book; and

The number of each of advertising phrases inserted into the electronic book.

If the electronic book is transmitted to the terminal device 20 in step S118, a new record is added to the distribution history table. Then, the information is registered in the individual fields of the newly added record.

The processing when the electronic book data and the advertising phrase table are the data and the table as shown in FIGS. 5 and 6 has been described above. Processing when the electronic book data and the advertising phrase table are the data and the table as shown in FIGS. 7 and 8 will now be described. The processing when the electronic book data and the advertising phrase table are the data and the table as shown in FIGS. 7 and 8 differs from the processing when the electronic book data and the advertising phrase table are the data and the table as shown in FIGS. 5 and 6 in respects which will be described below.

When the electronic book data and the advertising phrase table are the data and the table as shown in FIGS. 7 and 8, the tag found in step S102 is acquired in step S103 of FIG. 11. In step S114 of FIG. 12, the tag found in step S112 is acquired. In step S104 of FIG. 11, whether or not a plurality of advertising phrases are associated with the tag acquired in step S103 (or step S114) is determined.

In step S106 of FIG. 11, a combination of the tag acquired in step S103 (or step S114) and the advertising phrase acquired in step S105 is registered in the correspondence relationship table. That is, the correspondence relationship table in this case is data indicating the correspondence relationship between the tag and the advertising phrase. In other words, the correspondence relationship table is data that includes the "tag" and "advertising phrase" fields, as shown in FIG. 16.

In step S108 of FIG. 11, whether or not only one advertising phrase is associated with the tag acquired in step S103 (or step S114) is determined. Then, in step S109, a combination of the tag acquired in step S103 (or step S114) and the one advertising phrase is registered in the correspondence relationship table. In step S111, only the tag acquired in step S103 (or step S114) is registered in the correspondence relationship table.

Furthermore, in step S115 of FIG. 12, whether or not the tag acquired in step S114 has been registered in the correspondence relationship table is determined. In step S116, whether or not the advertising phrase corresponding to the tag acquired in step S114 is registered in the correspondence relationship table is determined. If the advertising phrase corresponding to the tag acquired in step S114 is registered in the correspondence relationship table, the advertising phrase is acquired, and in step S117, in the electronic book, the replacement target phrase indicated by the tag found in step S112 is replaced with the acquired advertising phrase.

Figures 17, 18:
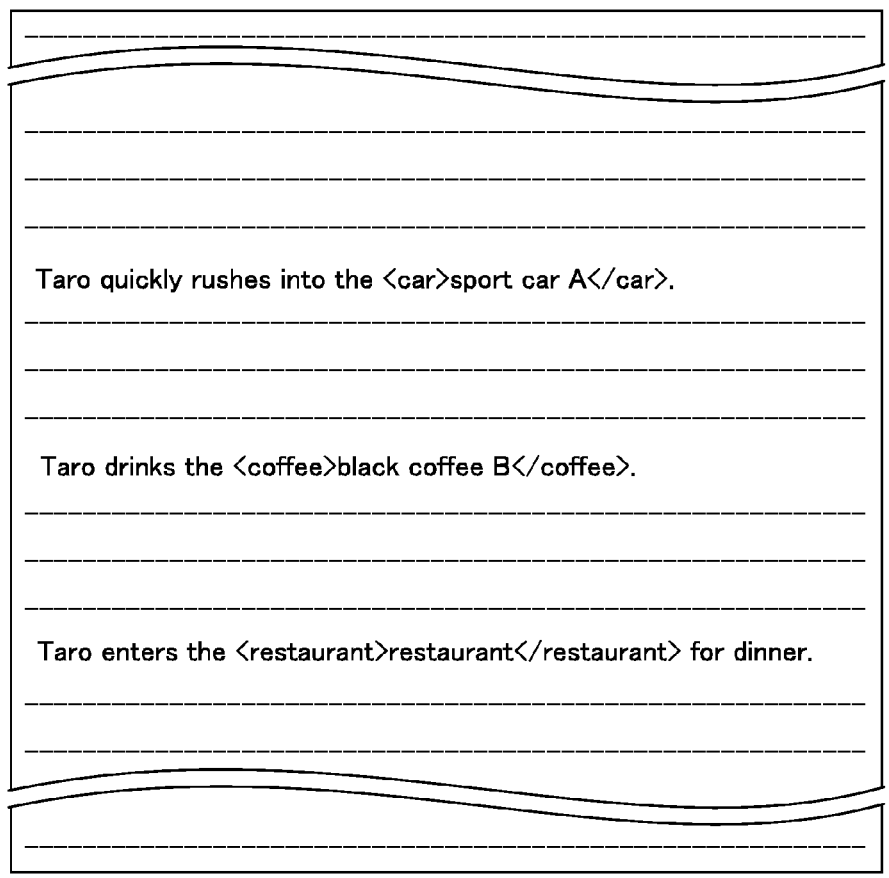
FIG. 17 A diagram showing another example of the electronic book data into which advertising phrases are inserted.
FIG. 18 A diagram showing another example of the correspondence relationship table.

The electronic book data transmitted to the terminal device 20 in step S118 of FIG. 12 is, for example, one that is shown in FIG. 17.

Processing when the electronic book data and the advertising phrase table are the data and the table as shown in FIGS. 9 and 10 will also be described. The processing when the electronic book data and the advertising phrase table are the data and the table as shown in FIGS. 9 and 10 differs from the processing when the electronic book data and the advertising phrase table are the data and the table as shown in FIGS. 5 and 6 in respects which will be described below.

When the electronic book data and the advertising phrase table are the data and the table as shown in FIGS. 9 and 10, the tag found in step S102 is acquired in step S103 of FIG. 11. In step S114 of FIG. 12, the tag found in step S112 is acquired. Then, in step S104 of FIG. 11, whether or not a plurality of advertising phrases are associated with the tag acquired in step S103 (or step S114) is determined.

In step S106 of FIG. 11, a combination of the tag acquired in step S103 (or step S114), an original phrase corresponding to the tag acquired in step S103 (or step S114), and the advertising phrase selected in step S105 is registered in the correspondence relationship table. That is, the correspondence relationship table in this case is data indicating the correspondence relationship between the tag, the original phrase, and the advertising phrase. In other words, the correspondence relationship table is data that includes the "tag", "original phrase" and "advertising phrase" fields, for example as shown in FIG. 18.

In step S107 of FIG. 11, the advertising phrase selected in step S105 is inserted into the position indicated by the tag found in step S102 (or step S112). For example, the advertising phrase selected in step S105 is inserted behind the tag found in step S102 (or step S112).

In step S108 of FIG. 11, whether or not only one advertising phrase is associated with the tag acquired in step S103 (or step S114) is determined. Then, in step S109, a combination of the tag acquired in step S103 (or step S114), the original phrase corresponding to the tag acquired in step S103 (or step S114), and the one advertising phrase described above is registered in the correspondence relationship table. In step S110, the one advertising phrase is inserted into the position indicated by the tag found in step S102 (or step S112). For example, the one advertising phrase described above is inserted behind the tag found in step S102 (or step S112).

In step S111 of FIG. 11, only the tag acquired in step S103 (or step S114) and the original phrase corresponding to the tag acquired in step S103 (or step S114) are registered in the correspondence relationship table.

After the processing of step S111 of FIG. 11 is performed, the original phrase corresponding to the tag acquired in step S103 (or step S114) is acquired. Then, the acquired original phrase is inserted into the position indicated by the tag found in step S102 (or step S112). For example, the original phrase is inserted behind the tag found in step S102 (or step S112).

Furthermore, in step S115 of FIG. 12, whether or not the tag acquired in step S114 has been registered in the correspondence relationship table is determined. In step S116, whether or not the advertising phrase corresponding to the tag acquired in step S114 is registered in the correspondence relationship table is determined. If the advertising phrase corresponding to the tag acquired in step S114 is registered in the correspondence relationship table, the advertising phrase is acquired, and in step S117, in the electronic book, the acquired advertising phrase is inserted into the position indicated by the tag found in step S112. On the other hand, if the advertising phrase corresponding to the tag acquired in step S114 is not registered in the correspondence relationship table, the original phrase corresponding to the tag acquired in step S114 is acquired from the correspondence relationship table, and in the electronic book, the acquired original phrase is inserted into the position indicated by the tag found in step S112.

The electronic book data transmitted to the terminal device 20 in step S118 of FIG. 12 is, for example, one that is shown in FIG. 19. The description of the processing performed in the distribution system 10 when the purchasing procedure of the electronic book is completed has been completed.

The electronic book reception unit 200 and the output control unit 202 will be described. The electronic book reception unit 200 and the output control unit 202 are realized in the terminal device 20. Specifically, the control unit of the terminal device 20 performs processing according to the program stored in the auxiliary storage unit, and thus the control unit functions as the electronic book reception unit 200 and the output control unit 202.

The electronic book reception unit 200 receives the electronic book transmitted by the electronic book transmission unit 110. The output control unit 202 causes an output unit (for example, the display unit or the sound output unit) to output the electronic book received by the electronic book reception unit 200. In other words, the output control unit 202 causes the output unit included in the terminal device 20 to output the electronic book in which the insertion of the advertising phrase has been performed by the advertising phrase insertion unit 108.

For example, the output control unit 202 displays, on the display unit, the electronic book received by the electronic book reception unit 200. The display unit can display a plurality of lines in the electronic book, and the output control unit 202 makes the display unit display the electronic book while starting a new line according to the number of characters per line of the display unit. The output control unit 202 ignores the tag embedded in the electronic book, and does not display the tag on the display unit.

In the electronic book provision system 1 according to the first embodiment as described above, the advertising phrase is inserted into the text of the electronic book (for example, a novel). According to the electronic book provision system 1, when the user reads the electronic book (for example, a novel), the user inevitably notices the advertisement. In the electronic book provision system 1, the advertisement can fit in the text of the electronic book, and thus it is possible to more naturally provide the advertisement.

As shown in FIG. 4, the electronic book provision system 1 includes not only the functional blocks described above but also a basic information acquisition unit 112 and an advertisement billing unit 114.

The basic information acquisition unit 112 and the advertisement billing unit 114 are realized in the distribution system 10. For example, the basic information acquisition unit 112 and the advertisement billing unit 114 are realized by the electronic book distribution device 12. Specifically, the control unit of the electronic book distribution device 12 performs processing according to the program stored in the auxiliary storage unit, and thus the control unit functions as the basic information acquisition unit 112 and the advertisement billing unit 114.

The basic information acquisition unit 112 acquires information necessary for calculating a billing amount for the advertiser. In other words, the basic information acquisition unit 112 acquires information used as the basis when the billing amount for the advertiser is calculated. The advertisement billing unit 114 calculates the billing amount for the advertiser based on the information acquired by the basic information acquisition unit 112.

Examples of the information acquired by the basic information acquisition unit 112 will be described below. Here, four examples [A] to [D] will be described. A description will be given below with the assumption that the company X is the advertiser.

[A] For example, the basic information acquisition unit 112 acquires information on the number of times an electronic book having an advertising phrase ("sport car A") of the company X inserted is distributed.

Based on the advertising phrase table (FIGS. 6, 8 and 10) and the distribution history table (FIG. 15), the basic information acquisition unit 112 acquires the number of times the electronic book having the advertising phrase of the company X inserted is distributed. In other words, the basic information acquisition unit 112 acquires the advertising phrase of the company X based on the advertising phrase table, and acquires, based on the "advertising phrase information" field of the distribution history table, the number of times the electronic book having the advertising phrase of the company X inserted is distributed.

A method of acquiring the number of times the electronic book having the advertising phrase of the company X inserted is distributed is not limited to the above method. For example, the database 14 stores a counter such that the counter is associated with the company X, and the basic information acquisition unit 112 may increment the value of the counter by one each time the electronic book including the advertising phrase of the company X is distributed.

The advertisement billing unit 114 calculates the billing amount for the company X based on the number of times the electronic book having the advertising phrase of the company X inserted is distributed.

In order to calculate the billing amount based on the number of times the electronic book is distributed, it is necessary to acquire information on the correspondence relationship between the number of times of the distribution and the billing amount. Hence, the information on the correspondence relationship between the number of times of the distribution and the billing amount is stored in the auxiliary storage unit. This information is set such that, for example, as the number of times of the distribution is increased, the billing amount is increased.

The following formula (1) is an example of the information on the correspondence relationship between the number of times of the distribution and the billing amount. The following formula (1) is a formula for calculating the billing amount (f) for the company X, and in the following formula (1), "x" represents the number of times the electronic book including the advertising phrase of the company X is distributed, and "a" represents a billing amount for one distribution.

$$f = a * x \tag{1}$$

The advertisement billing unit 114 calculates the billing amount for the company X based on the number of times the electronic book including the advertising phrase of the company X is distributed and the above formula (1).

The information indicating the correspondence relationship between the number of times of the distribution and the billing amount is not limited to information in the form of a mathematical expression, and may be information in the form of a table correlating the number of times of the distribution and the billing amount.

In this way, it is possible to bill the advertiser with consideration given to the number of times the electronic book including the advertising phrase of the advertiser is distributed. Consequently, it is possible to appropriately bill the advertiser.

[B] For example, the basic information acquisition unit 112 acquires information on the number of advertising phrases of the company X inserted into the text of the electronic book. For example, the basic information acquisition unit 112 acquires the number of advertising phrases of the company X inserted into the text of the electronic book based on the electronic book into which the advertising phrases have been inserted by the advertising phrase insertion unit 108.

The number of advertising phrases of the company X inserted into the text of the electronic book is equal to the number of "replacement target phrases or tags associated with the advertising phrase of the company X" included in the original electronic book (that is, the electronic book before the insertion of the advertising phrase by the advertising phrase insertion unit 108). For example, the number of advertising phrases "sport car A" included in the text of the electronic book shown in FIG. 14, 17, or 19 is equal to the number of replacement target phrases "car" included in the text of the electronic book shown in FIG. 5, the number of combinations of <car> and </car> included in the text of the electronic book shown in FIG. 7, or the number of <car> included in the text of the electronic book shown in FIG. 9.

Hence, the basic information acquisition unit 112 acquires the number of "replacement target phrases or tags associated with the advertising phrase of the company X" included in the original electronic book (that is, the electronic book before the insertion of the advertising phrases by the advertising phrase insertion unit 108), and thereby may acquire the number of advertising phrases of the company X inserted into the text of the electronic book.

The advertisement billing unit 114 calculates the billing amount of the company X produced by the insertion of the advertising phrases of the company X into the text of the electronic book based on the number of advertising phrases of the company X inserted into the text of the electronic book.

In order to calculate the billing amount based on the number of advertising phrases of the company X inserted into the text of the electronic book, it is necessary to acquire information on the correspondence relationship between the number of advertising phrases and the billing amount. Hence, the information on the correspondence relationship between the number of advertising phrases and the billing amount is stored in the auxiliary storage unit. This information is set such that, for example, as the number of advertising phrases is increased, the billing amount is increased.

The following formula (2) is an example of the information on the correspondence relationship between the number of advertising phrases and the billing amount. The following formula (2) is a formula for calculating the billing amount (f) for the company X, and in the following formula (2), "x" represents the number of advertising phrases of the company X included in the electronic book, and "b" represents a billing amount for one advertising phrase.

$$f=b*x \qquad (2)$$

The advertisement billing unit 114 calculates the billing amount for the company X produced by the insertion of the advertising phrases of the company X into the text of the electronic book based on the number of advertising phrases of the company X inserted into the text of the electronic book and the above formula (2).

The information indicating the correspondence relationship between the number of advertising phrases and the billing amount is not limited to information in the form of a mathematical expression, and may be information in the form of a table correlating the number of advertising phrases and the billing amount.

In this way, it is possible to bill the advertiser with consideration given to the number of advertising phrases of the advertiser inserted into the text of the electronic book. Consequently, it is possible to appropriately bill the advertiser.

[C] For example, the basic information acquisition unit 112 may acquire the number of times the advertising phrase of the company X is output in the terminal device 20.

In this case, a basic information transmission unit 204 included in the terminal device 20 transmits, to the distribution system 10, information on the number of times the advertising phrase is output in the terminal device 20. Then, the basic information acquisition unit 112 receives the information transmitted from the terminal device 20.

The advertisement billing unit 114 calculates the billing amount for the company X based on the number of times the advertising phrase of the company X is output in the terminal device 20. For example, the advertisement billing unit 114 acquires, from the above information, the number of times the advertising phrase of the company X is output in the terminal device 20. Then, the advertisement billing unit 114 calculates the billing amount for the company X based on the acquired number of times of the output.

In order to calculate the billing amount based on the number of times the advertising phrase is output, information on a correspondence relationship between the number of times the advertising phrase is output and the billing amount is needed. Hence, the information on the correspondence relationship between the number of times the advertising phrase is output and the billing amount is stored in the auxiliary storage unit. This information is set such that, for example, as the number of times the advertising phrase is output is increased, the billing amount is increased.

The following formula (3) is an example of the information on the correspondence relationship between the number of times the advertising phrase is output and the billing amount. The following formula (3) is a formula for calculating the billing amount (f) for the company X, and in the following formula (3), "x" represents the number of times the advertising phrase of the company X is output, and "c" represents a billing amount per output.

$$f=c*x \qquad (3)$$

The advertisement billing unit 114 calculates the billing amount for the company X based on the number of times the advertising phrase of the company X is output in the terminal device 20 and the above formula (3).

The information indicating the correspondence relationship between the number of times the advertising phrase is output and the billing amount is not limited to information in the form of a mathematical expression, and may be information in the form of a table correlating the number of times the advertising phrase is output and the billing amount.

In this way, it is possible to bill the advertiser with consideration given to the number of times the advertising phrase of the advertiser is output. Consequently, it is possible to appropriately bill the advertiser.

[D] For example, the basic information acquisition unit 112 acquires information on the position in which the advertising phrase of the company X is inserted into the text of the electronic book. For example, based on the electronic book into which the advertising phrases have been inserted by the advertising phrase insertion unit 108, the basic information acquisition unit 112 acquires the position of the advertising phrase of the company X inserted into the text of the electronic book.

The position in which the advertising phrase of the company X is inserted is the same as the position of "replacement target phrase or tag associated with the advertising phrase of the company X" included in the original electronic book (that is, the electronic book before the insertion of the advertising phrase by the advertising phrase insertion unit 108). For example, the position of advertising phrase "sport car A" included in the text of the electronic book shown in FIG. 14, 17, or 19 is the same as the position of replacement target phrase "car" included in the text of the electronic book shown in FIG. 5, the position of replacement target phrase "car" sandwiched between <car> and </car> included in the text of the electronic book shown in FIG. 7, or the position of <car> included in the text of the electronic book shown in FIG. 9.

Hence, the basic information acquisition unit 112 acquires the position of "replacement target phrase or tag associated with the advertising phrases of the company X" included in the original electronic book (that is, the electronic book before the insertion of the advertising phrase by the advertising phrase insertion unit 108), and thereby may acquire the position in which the advertising phrase of the company X are inserted into the text of the electronic book. The same is true for the case where the position in which another advertising phrase is inserted is acquired.

The advertisement billing unit 114 determines the billing amount for the company X produced by the insertion of the advertising phrase of the company X into the text of the electronic book based on the position in which the advertising phrase of the company X are inserted. An example where the billing amount for the company X is calculated based on the position in which the advertising phrase of the company X is inserted will be described below. Here, three examples [D-1] to [D-3] will be described.

[D-1] For example, the auxiliary storage unit of the electronic book distribution device 12 stores parts of the text of the electronic book and information on the billing amount for the advertiser so as to associate them with each other. FIG. 20 shows an example of the parts of the text of the electronic book and the information on the billing amount for the advertiser. In the example of FIG. 20, the billing amount for the advertiser is defined for each chapter of the electronic book.

In the example of FIG. 20, for example, the billing amount is set such that the billing amount for a chapter which is expected to be read in a more concentrated manner by the user is increased. In other words, for example, the billing amount is set such that the billing amount for a chapter where there is an exciting scene is increased. Although the billing amount is set for each chapter, the billing amount may be set for each part which is smaller than a chapter.

The advertisement billing unit 114 calculates the billing amount for the company X produced by the insertion of the advertising phrase of the company X into the text of the electronic book, based on the position in which the advertising phrase of the company X is inserted and the information shown in FIG. 20. For example, when the advertising phrase of the company X is inserted into Chapter 3 of the electronic book twice, the advertisement billing unit 114 calculates the billing amount for the company X at "F3*2". Moreover, for example, when the advertising phrase of the company X is inserted into Chapter 1 three times and is inserted into Chapter 2 once, the advertisement billing unit 114 calculates the billing amount for the company X at "F1*3+F2*1".

When the advertising phrase is present in a part which is expected to be read in a more concentrated manner by the user, it is probably unlikely that the user skips the advertising phrase (that is, does not notice the advertising phrase). In other words, it is probably highly likely that the user recognizes the advertisement. In this respect, in this way, it is possible to bill the advertiser with consideration given to a high probability that the user recognizes the advertisement. Consequently, it is possible to appropriately bill the advertiser.

[D-2] For example, the advertisement billing unit 114 calculates the billing amount for the company X produced by the insertion of the advertising phrase of the company X into the text of the electronic book, based on the distance between the advertising phrase of the company X and another advertising phrase in the text of the electronic book.

The "distance between the advertising phrase of the company X and another advertising phrase" refers to the "distance between the advertising phrase of the company X and another advertising phrase present immediately before and/or immediately after the advertising phrase of the company X", and means the following distances, for example:

the distance between the advertising phrase of the company X and another advertising phrase present immediately before advertising phrase of the company X;

the distance between the advertising phrase of The company X and another advertising phrase present immediately after the advertising phrase of the company X; and the distance obtained by adding the "distance between the advertising phrase of the company X and another advertising phrase present immediately before the advertising phrase of the company X" and the "distance between the advertising phrase of the company X and another advertising phrase present immediately after the advertising phrase of the company X".

The "distance" refers to, for example, the number of characters between the advertising phrase of the company X and another advertising phrase. The "distance" may refer to, for example, the number of lines between the line including the advertising phrase of the company X and the line including another advertising phrase.

In order to calculate the billing amount based on the distance between the advertising phrase of the company X and another advertising phrase, information on a correspondence relationship between the distance and the billing amount is needed. Hence, the information on the correspondence relationship between the distance and the billing amount is stored in the auxiliary storage unit. This information is set such that, for example, as the distance is increased, the billing amount is increased.

FIG. 21 shows an example of the information on a correspondence relationship between the distance and the billing amount. In FIG. 21, "D1" and "D2" indicate predetermined reference distances (for example, the number of characters or the number of lines), and have a relationship of "D1<D2". "F1", "F2" and "F3" indicate predetermined billing amounts, and have a relationship of "F1<F2<F3". In other words, in the example shown in FIG. 21, as the distance (for example, the number of characters or the number of lines) is increased, the billing amount is increased.

The advertisement billing unit 114 calculates the billing amount for the company X produced by the insertion of the advertising phrase of the company X into the text of the electronic book, based on the distance between the advertising phrase of the company X and another advertising phrase and the information shown in FIG. 21.

For example, when the advertising phrase of the company X in which the above distance (d) is "0≤d<D1" and the advertising phrase of the company X in which the above distance (d) is "D1≤d<D2" are inserted into the text of the electronic book, the advertisement billing unit 114 calculates the billing amount for the company X at "F1+F2".

The information indicating the correspondence relationship between the distance and the billing amount is not limited to information in the form of a table, and may be information in the form of a mathematical expression for calculating the billing amount based on the distance.

When another advertising phrase is present in the vicinity of the advertising phrase of the company X, the advertising phrase of the company X is not noticeable, and thus its advertising effect is probably reduced. On the other hand, when another advertising phrase is not present in the vicinity of the advertising phrase of the company X, the advertising phrase of the company X is more noticeable, and thus its advertising effect is probably increased. In this respect, in this way, it is possible to bill the advertiser with consideration given to whether or not the advertising phrase is noticeable. Consequently, it is possible to appropriately bill the advertiser.

[D-3] For example, the advertisement billing unit 114 calculates the billing amount for the company X produced by the insertion of the advertising phrase of the company X into the sentences of the electronic book, based on the result of comparison between the number of advertising phrases of the company X inserted into a predetermined number of pages of the electronic book and the number of other advertising phrases inserted into the predetermined number of pages of the electronic book.

Here, the "predetermined number of pages" is, for example, one page. For example, when two pages of the electronic book are displayed on the display unit of the terminal device 20, the "predetermined number of pages" may be two pages.

For example, the advertisement billing unit 114 calculates values indicating the result of comparison between the number of advertising phrases of the company X inserted into the predetermined number of pages of the electronic book and the number of other advertising phrases inserted into the predetermined number of pages of the electronic book. More specifically, the advertisement billing unit 114 calculates an occupancy (r) of the advertising phrase of the company X in the predetermined number of pages of the electronic book.

When it is assumed that the number of advertising phrases of the company X inserted into the predetermined number of pages of the electronic book is N1, and that the number of other advertising phrases inserted into the predetermined number of pages of the electronic book is N2, the occupancy (r) of the advertising phrase of the company X is calculated by formula (5) below.

$$r=N1/(N1+N2) \quad (5)$$

Based on the above occupancy, the advertisement billing unit 114 calculates the billing amount for the company X produced by the insertion of the advertising phrases of the company X into the text of the electronic book.

In a case where the billing amount is calculated based on the occupancy, information on a correspondence relationship between the occupancy and the billing amount is needed. Hence, the information on the correspondence relationship between the occupancy and the billing amount is stored in the auxiliary storage unit of the advertisement billing unit 114. For example, this information is set, as the occupancy is increased, the billing amount is increased.

FIG. 22 shows an example of the information on the correspondence relationship between the occupancy and the billing amount. In FIG. 22, "R1" and "R2" represent predetermined reference occupancy, and have a relationship of "R1<R2". "F1", "F2" and "B3" represent predetermined billing amounts, and have a relationship of "F1<F2<F3". In the example shown in FIG. 22, as the occupancy is increased, the billing amount is increased.

The advertisement billing unit 114 calculates the billing amount for the company X produced by the insertion of the advertising phrases of the company X into the text of the electronic book, based on the occupancy (r) of the advertising phrases of the company X in the predetermined number of pages of the electronic book and the information shown in FIG. 22.

For example, when the advertising phrases of the company X are included in a page Pa and a page Pb of the electronic book, the advertisement billing unit 114 calculates an occupancy (ra) of the advertising phrases of the company X in the page Pa and an occupancy (rb) of the advertising phrases of the company X in the page Pb. Further, for example, when the occupancy (ra) satisfies "0≤ra<R1" and the above occupancy (rb) satisfies "R2≤rb", the advertisement billing unit 114 calculates the billing amount at "F1+F3".

The information indicating the correspondence relationship between the occupancy and the billing amount is not limited to information in the form of a table, and may be information in the form of a mathematical expression for calculating the billing amount based on the occupancy.

A case where the occupancy of the advertising phrases of the company X is low refers to a case where a larger number of other advertising phrases are included than the advertising phrases of the company X in the same page or a case where about as many other advertising phrases as the advertising phrases of the company X are included. In this kind of case, probably, the advertising phrases of the company X are not noticeable, and its advertising effect is decreased. On the other hand, a case where the occupancy of the advertising phrases of the company X is high refers to a case where no other advertising phrases are included in the same page or a case where a significantly fewer number of other advertising phrases are included in the same page than the advertising phrases of the company X. In this kind of case, probably, the advertising phrases of the company X are more noticeable, and its advertising effect is increased. In this respect, in this way, it is possible to bill the advertiser with consideration given to whether or not the advertising phrases are noticeable. Consequently, it is possible to appropriately bill the advertiser.

Incidentally, as described above, the position in which the advertising phrase of the company X is inserted is the same as the position of "replacement target phrase or tag associated with the advertising phrase of the company X" included in the original electronic book (that is, the electronic book before the insertion of the advertising phrase by the advertising phrase insertion unit 108). For example, the position of advertising phrase "sport car A" included in the text of the electronic book shown in FIG. 14, 17, or 19 is the same as the position of replacement target phrases "car" included in the text of the electronic book shown in FIG. 5, the position of replacement target phrases "car" sandwiched between <car> and </car> included in the text of the electronic book shown in FIG. 7, or the position of <car> included in the text of the electronic book shown in FIG. 9.

Hence, the number of "replacement target phrases or tags associated with the advertising phrase of The company X" included in a predetermined number of pages of the original electronic book is acquired, and thus the number of advertising phrases of the company X inserted into the predetermined number of pages of the electronic book may be acquired. The same is true for a case where the number of other advertising phrases inserted into the predetermined number of pages of the electronic book is acquired.

As shown in FIG. 4, the electronic book provision system 1 includes not only the functional blocks described above but also a sales price determination unit 116.

The sales price determination unit 116 is realized by the distribution system 10. For example, the sales price determination unit 116 is realized by the electronic book distribution device 12. In other words, the control unit of the electronic book distribution device 12 performs processing according to the program stored in the auxiliary storage unit, and thus the control unit functions as the sales price determination unit 116.

The sales price determination unit 116 determines the sales price of the electronic book based on the billing amount for the advertiser produced by the insertion of the advertising phrase into the text of the electronic book. For example, the sales price determination unit 116 sets, as the sales price of the electronic book, a price lower than the basic sales price of the electronic book based on the billing amount for the advertiser produced by the insertion of the advertising phrase into the text of the electronic book.

Specifically, as the sales price of the electronic book, the sales price determination unit 116 sets a price obtained by subtracting, from the basic sales price of the electronic book, a discount amount determined based on the billing amount for the advertiser produced by the insertion of the advertising phrase into the text of the electronic book.

In this case, in order to determine the discount amount based on the billing amount for the advertiser, information on a correspondence relationship between the billing amount and the discount amount is needed. Hence, the correspondence relationship between the billing amount and the discount amount is stored in the auxiliary storage unit of the electronic book distribution device 12.

FIG. 23 shows an example of the information on the correspondence relationship between the billing amount and the discount amount. FIG. 23 is a table in which the billing amount and the discount amount are associated with each other. In FIG. 23, "F1" and "F2" represent predetermined reference billing amounts, and have a relationship of "F1<F2". "S1", "S2" and "S3" represent predetermined discount amounts, and have a relationship of "S1<S2<S3". In other words, in the example shown in FIG. 23, as the billing amount is increased, the discount amount is increased.

For example, when the billing amount (f) for the company X produced by the insertion of the advertising phrase of the company X into the text of the electronic book falls within "F1≤f<F2", the sales price determination unit 116 sets, as the sales price of the electronic book, a price obtained by subtracting the discount amount (S2) from the basic sales price.

Incidentally, the table shown in FIG. 23 may be a table in which the billing amount and a discount rate are associated with each other. In this case, the sales price determination unit 116 determines the sales price in a manner described below. For example, when the billing amount (f) for the company X produced by the insertion of the advertising phrase of the company X into the text of the electronic book falls within "F1≤f<F2", the sales price determination unit 116 acquires the discount rate associated with the range "F1≤f<F2". The sales price determination unit 116 calculates the discount amount by multiplying the basic sales price of the electronic book by the discount rate. Then, the sales price determination unit 116 sets, as the sales price of the electronic book, a price obtained by subtracting the discount amount from the basic sales price.

The information on the correspondence relationship between the billing amount and the discount amount is not limited to information in the form of a table, and may be information in the form of a mathematical expression for calculating the discount amount based on the billing amount.

In this way, it is possible to decrease the sales price of the electronic book according to the billing amount for the advertiser. Consequently, it is possible to enhance the buyer's motivation for purchasing the electronic book.

As shown in FIG. 4, the electronic book provision system 1 includes not only the functional blocks described above but also a point information storage unit 118 and a point information update unit 120.

The point information storage unit 118 and the point information update unit 120 are realized by the distribution system 10. For example, the point information storage unit 118 is realized by the database 14, and the point information update unit 120 is realized by the electronic book distribution device 12. In other words, the control unit of the electronic book distribution device 12 performs processing according to the program stored in the auxiliary storage unit, and thus the control unit functions as the point information update unit 120.

The point information storage unit 118 will first be described. The point information storage unit 118 stores the point information such that the point information is associated with user identification information for identifying each user. The point information is information that indicates how many points, which can be used as the currency when the user purchases the electronic book, the user has.

FIG. 24 shows an example of a point table stored in the point information storage unit 118. The point table shown in FIG. 24 includes "user ID" and "point" fields. The "user ID" field indicates identification information that uniquely identifies each user. The "point" field indicates how many points the user has.

The point information update unit 120 will now be described. The point information update unit 120 updates the point information stored to associate with identification information on the user who is provided with the electronic book, based on the billing amount for the advertiser produced by the insertion of the advertising phrase into the electronic book.

For example, when the advertising phrase of the company X is inserted into the electronic book, the point information update unit 120 acquires the billing amount for the company X produced by the insertion of the advertising phrase of the company X into the electronic book. Then, based on the billing amount for the company X, the point information update unit 120 increases the points stored to associate with the user ID of the user who purchases the electronic book. In other words, the point information update unit 120 gives the user the points based on the billing amount for the company X. In this case, the point information update unit 120 determines the increasing number of points (the number of points given to the user) based on the billing amount for the company X.

In order to determine the increasing number of points based on the billing amount, information on a correspondence relationship between the billing amount and the points is needed. Hence, the information on the correspondence relationship between the billing amount and the points is stored in the auxiliary storage unit of the electronic book distribution device 12.

FIG. 25 shows an example of the information on the correspondence relationship between the billing amount and the points. FIG. 25 is a table in which the billing amount and the points are associated with each other. In FIG. 25, "F1" and "F2" represent predetermined reference billing amounts, and have a relationship of "F1<F2". "P1", "P2" and "P3" represent predetermined points, and have a relationship of "P1<P2<P3". In other words, in the table shown in FIG. 25, as the billing amount is increased, the points given to the user is increased.

The point information update unit 120 determines the increasing number of points of the user (the number of points given to the user) who purchases the electronic book based on the billing amount for the company X produced by the insertion of the advertising phrase of the company X into the electronic book and the table shown in FIG. 25.

For example, when the billing amount (f) for the company X produced by the insertion of the advertising phrase of the company X into the electronic book falls within "F1≤f<F2", the point information update unit 120 determines that the number of points given to the user is "P2". Then, the point information update unit 120 increases the number of points associated with the user ID of the user by the determined number of points.

The information on the correspondence relationship between the billing amount and the points is not limited to information in the form of a table, and may be information in the form of a mathematical expression for calculating the points based on the billing amount.

In this way, it is possible to give points to the user who purchases the electronic book according to the billing amount for the advertiser. Consequently, it is possible to enhance the buyer's motivation for purchasing the electronic book.

Incidentally, the electronic book provision system 1 preferably has either of the sales price determination unit 116, and the point information update unit 120 (and the point information storage unit 118). In other words, when the electronic book provision system 1 has the sales price determination unit 116, the point information update unit 120 (and the point information storage unit 118) may be omitted. On the other hand, when the electronic book provision system 1 has the point information update unit 120 (and the point information storage unit 118), the sales price determination unit 116 may be omitted.

Second Embodiment

An electronic book provision system according to a second embodiment of the present invention will be described. The overall configuration of the electronic book provision system 1 according to the second embodiment is the same as in the first embodiment.

The electronic book provision system 1 according to the second embodiment differs from that according to the first embodiment in that the insertion of the advertising phrase into the text of the electronic book is performed in the terminal device 20.

Figure 26:
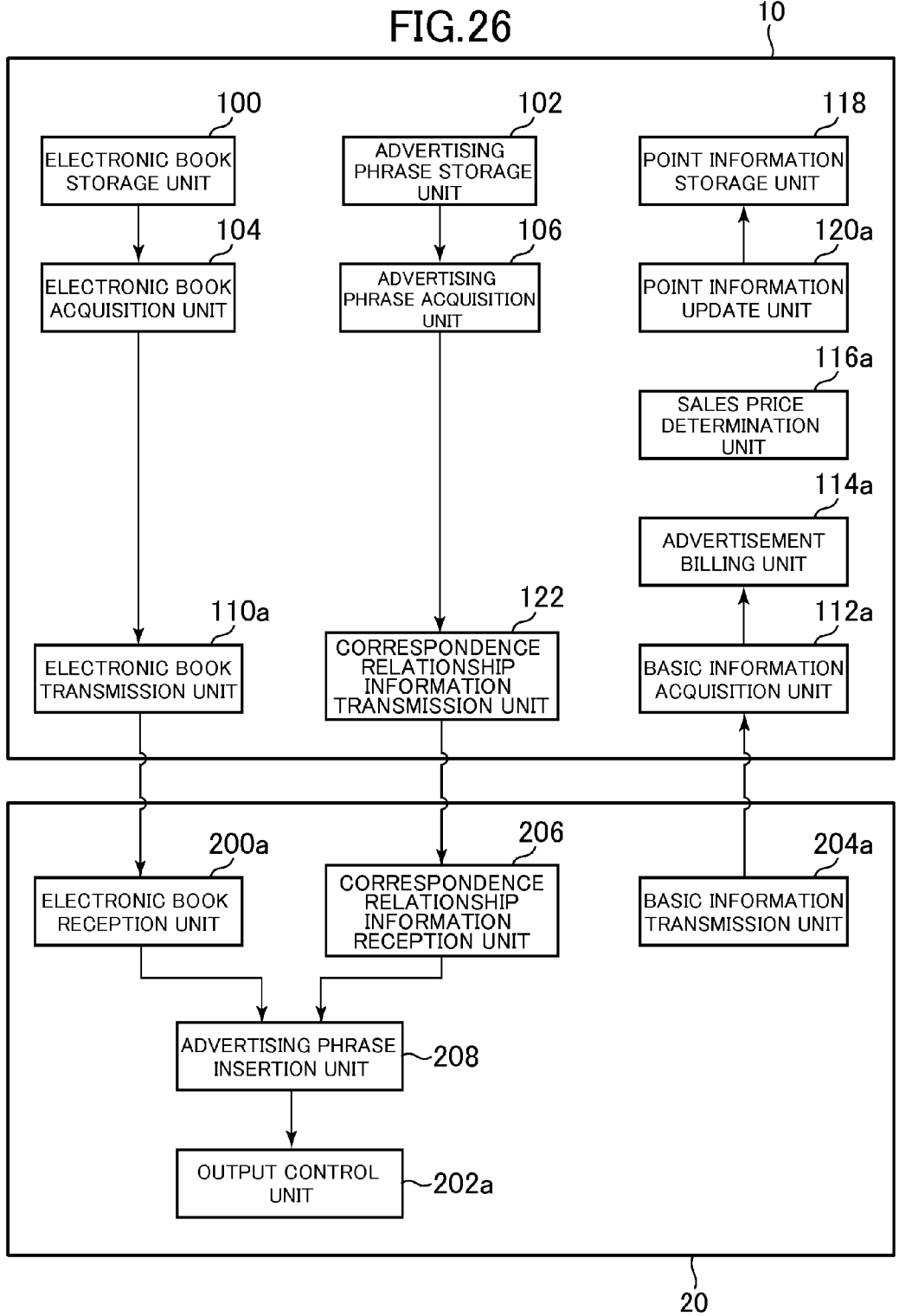
FIG. 26 A functional block diagram of the electronic book provision system according to a second embodiment.

FIG. 26 is a functional block diagram showing functional blocks related to the present invention among the functional blocks realized by the electronic book provision system 1 according to the second embodiment. In the functional block diagram shown in FIG. 26, the same function blocks as in the first embodiment are identified by the same symbols in FIG. 4.

As shown in FIG. 26, the electronic book provision system 1 according to the second embodiment includes the electronic book storage unit 100, the advertising phrase storage unit 102, the electronic book acquisition unit 104, the advertising phrase acquisition unit 106, an electronic book transmission unit 110a, a correspondence relationship information transmission unit 122, an electronic book reception unit 200a, a correspondence relationship information reception unit 206, an advertising phrase insertion unit 208 and an output control unit 202a. These functional blocks are functional blocks for providing the user with the electronic book having the advertising phrase inserted. The electronic book provision system 1 includes functional blocks other than these functional blocks, and the functional blocks other than the functional blocks described above will be described later.

Since the electronic book storage unit 100, the advertising phrase storage unit 102, the electronic book acquisition unit 104 and the advertising phrase acquisition unit 106 are the same as in the first embodiment, their description will be omitted here. The electronic book transmission unit 110a and the correspondence relationship information transmission unit 122 are realized by the distribution system 10. For example, the electronic book transmission unit 110a and the correspondence relationship information transmission unit 122 are realized by the electronic book distribution device 12.

The electronic book transmission unit 110a transmits the electronic book acquired by the electronic book acquisition unit 104 to the terminal device 20. In other words, the electronic book transmission unit 110a transmits the electronic book before the insertion of the advertising phrase to the terminal device 20.

The correspondence relationship information transmission unit 122 transmits, to the terminal device 20, information (correspondence relationship information) between the replacement target phrase or the tag embedded in the text of the electronic book and the advertising phrase. For example, the correspondence relationship information transmission unit 122 transmits, to the terminal device 20, the correspondence relationship tables (FIG. 13, 16, or 18) generated in the main memory unit in the processing shown in FIGS. 11 and 12 of the first embodiment.

Specifically, when the electronic book data and the advertising phrase table are the data and the table shown in FIGS. 5 and 6, the correspondence relationship information transmission unit 122 transmits the correspondence relationship table as shown in FIG. 13 to the terminal device 20. When the electronic book data and the advertising phrase table are the data and the table shown in FIGS. 7 and 8, the correspondence relationship information transmission unit 122 transmits the correspondence relationship table as shown in FIG. 16 to the terminal device 20. When the electronic book data and the advertising phrase table are the data and the table shown in FIGS. 9 and 10, the correspondence relationship information transmission unit 122 transmits the correspondence relationship table as shown in FIG. 18 to the terminal device 20.

Figure 27:
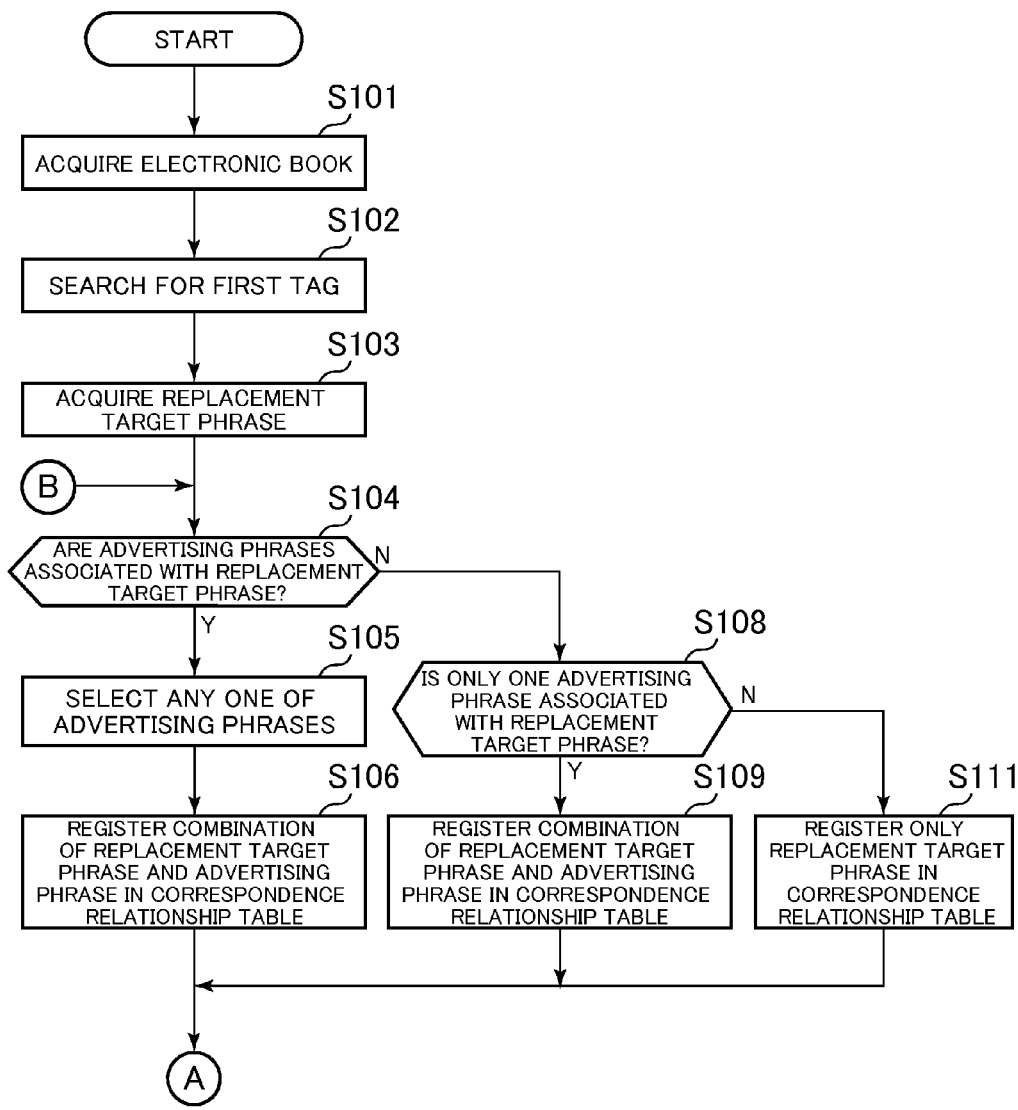
FIG. 27 A flowchart showing an example of processing performed in a distribution system in the second embodiment.
Figure 28:
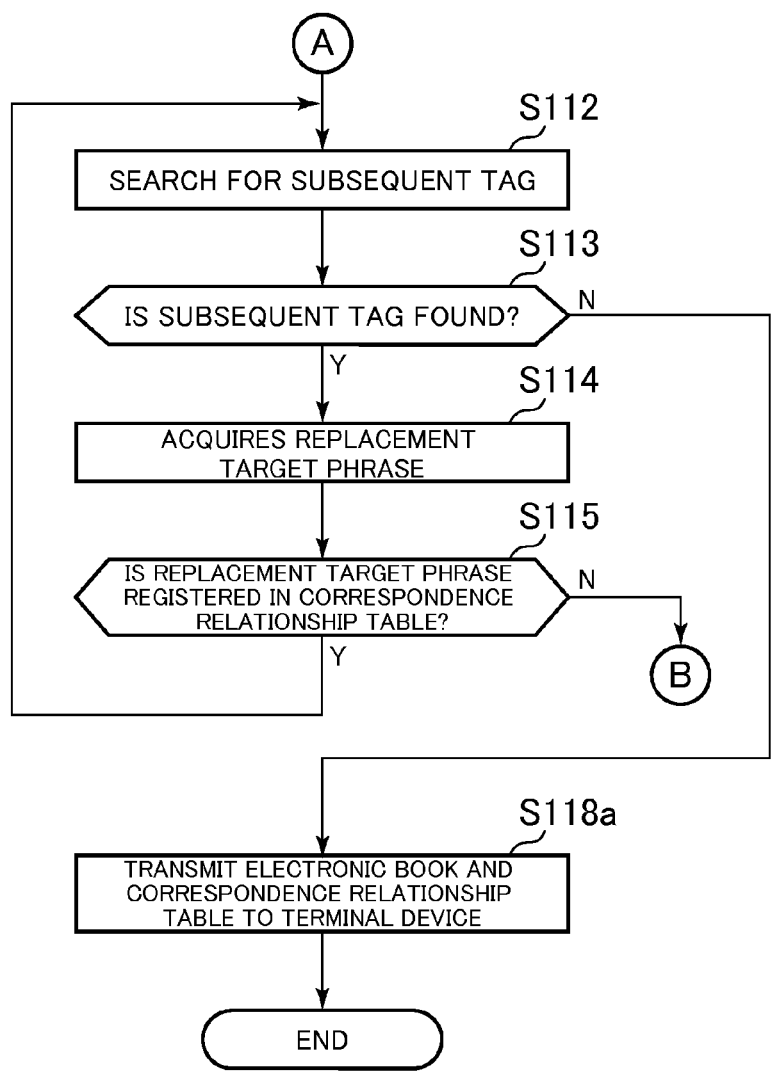
FIG. 28 A flowchart showing an example of the processing performed in the distribution system in the second embodiment.

Processing that is performed by the distribution system 10 when the purchasing procedure of the electronic book is completed will now be described. FIGS. 27 and 28 are flowcharts showing an example of the processing that is performed by the distribution system 10 when the purchasing procedure of the electronic book is completed. The control unit of the electronic book distribution device 12 performs the processing shown in FIGS. 27 and 28 according to the program stored in the auxiliary storage unit, and thus the control unit functions as the electronic book acquisition unit 104, the advertising phrase acquisition unit 106, an electronic book transmission unit 110a and a correspondence relationship information transmission unit 122. The processing shown in FIGS. 27 and 28 is processing when the electronic book data and the advertising phrase table are the data and the table as shown in FIGS. 5 and 6.

In FIG. 27, processing of steps S101 to S106, S108, S109 and S111 is the same as that in steps S101 to S106, S108, S109 and S111 in FIG. 11. Hence, the description of these steps will be omitted.

The processing shown in FIG. 27 differs from that shown in FIG. 11 in that steps S107 and S110 are not present. Specifically, in the processing shown in FIG. 27, after the processing of step S106 is performed, the processing of step S112 is performed. After the processing of step S109 is performed, the processing of step S112 is performed.

In FIG. 28, processing of steps S112 to S115 is the same as that of steps S112 to S115 in FIG. 12. Hence, the description of these steps will be omitted.

The processing shown in FIG. 28 differs from that shown in FIG. 12 in that steps S116 and S117 are not present. Specifically, in the processing shown in FIG. 28, after the processing of step S115 is performed, the processing of step S112 is performed.

The processing shown in FIG. 28 also differs from that shown in FIG. 12 in that processing of step S118a is performed instead of the processing of step S118. In step S118a, the control unit (the electronic book transmission unit 110a and the correspondence relationship information transmission unit 122) transmits the electronic book acquired in step S101 and the correspondence relationship table (FIG. 13) stored in the main memory unit to the terminal device 20.

Also in the electronic book provision system 1 according to the second embodiment, a distribution history table on the distribution history of the electronic book is stored in the database 14. The distribution history table in the second embodiment is basically the same as that in the first embodiment (FIG. 15). However, in the second embodiment, for example, the following information is registered in the "advertising phrase information" field:

A list of replacement target phrases embedded in the text of the electronic book;

The number of each of replacement target phrases embedded in the text of the electronic book; and The details of the correspondence relationship table transmitted to the terminal device 20.

The processing in a case where the electronic book data and the advertising phrase table are the data and the table as shown in FIGS. 5 and 6 has been described above. As in the first embodiment, the processing in a case where the electronic book data and the advertising phrase table are the data and the table as shown in FIGS. 7 and 8 differs from that in a case where the electronic book data and the advertising phrase table are the data and the table as shown in FIGS. 5 and 6 in some respects. However, these differences are the same as in the first embodiment, and thus their description will not be omitted.

When the electronic book data and the advertising phrase table are the data and the table as shown in FIGS. 7 and 8, for example, the following information is registered in the "advertising phrase information" field of the distribution history table:

A list of tags embedded in the text of the electronic book;

The number of tags embedded in the text of the electronic book; and

The details of the correspondence relationship table transmitted to the terminal device 20.

As in the first embodiment, the processing in a case where the electronic book data and the advertising phrase table are the data and the table as shown in FIGS. 9 and 10 differs from that in a case where the electronic book data and the advertising phrase table are the data and the table as shown in FIGS. 5 and 6 in some respects. However, these differences are the same as in the first embodiment, and thus their description will not be omitted.

When the electronic book data and the advertising phrase table are the data and the table as shown in FIGS. 9 and 10, for example, the following information is registered in the "advertising phrase information" field of the distribution history table:

A list of tags embedded in the text of the electronic book;

The number of tags embedded in the text of the electronic book; and

The details of the correspondence relationship table transmitted to the terminal device 20.

The description of the processing performed in the distribution system 10 when the purchasing procedure of the electronic book is completed has been completed.

The electronic book reception unit 200*a*, the correspondence relationship information reception unit 206, the advertising phrase insertion unit 208 and the output control unit 202*a* will be described.

The electronic book reception unit 200*a* receives the electronic book transmitted by the electronic book transmission unit 110*a*. In other words, the electronic book reception unit 200*a* receives the electronic book before the insertion of the advertising phrase. The correspondence relationship information reception unit 206 receives the correspondence relationship information transmitted by the correspondence relationship information transmission unit 122.

The advertising phrase insertion unit 208 inserts the advertising phrase into the text of the electronic book based on the tag included in the text of the electronic book received by the electronic book reception unit 200*a* and the correspondence relationship information received by the correspondence relationship information reception unit 206. The operation of the advertising phrase insertion unit 208 is basically similar to the operation of the advertising phrase insertion unit 108 in the first embodiment.

For example, when the electronic book data and the correspondence relationship table are the data and the table as shown in FIGS. 5 and 13, the advertising phrase insertion unit 208 replaces the replacement target phrases in the text of the electronic book indicated by the tag with the advertising phrase corresponding to the replacement target phrase, and thereby inserts the advertising phrase into the text of the electronic book. For example, the advertising phrase insertion unit 208 replaces the replacement target phrase "car" with the advertising phrase "sport car A", and thereby inserts the advertising phrase "sport car A" into the text of the electronic book. In this case, the electronic book into which the advertising phrase has been inserted by the advertising phrase insertion unit 208 is the same as the example shown in FIG. 14.

For example, when the electronic book data and the correspondence relationship table are the data and the table as shown in FIGS. 7 and 16, the advertising phrase insertion unit 208 replaces the replacement target phrases in the text of the electronic book indicated by the tag with the advertising phrase corresponding to the tag, and thereby inserts the advertising phrase into the text of the electronic book. For example, the advertising phrase insertion unit 208 replaces the replacement target phrase "car" sandwiched between <car> and </car> with the advertising phrase "sport car A" corresponding to <car> and </car>, and thereby inserts the advertising phrase "sport car A" into the text of the electronic book. In this case, the electronic book into which the advertising phrase has been inserted by the advertising phrase insertion unit 208 is the same as the example shown in FIG. 17.

For example, when the electronic book data and the correspondence relationship table are the data and the table as shown in FIGS. 9 and 18, the advertising phrase insertion unit 208 inserts the advertising phrase corresponding to the tag into position in the text of the electronic book indicated by the tag. For example, the advertising phrase insertion unit 208 inserts the advertising phrase "sport car A" corresponding to <car> into the position indicated by <car>, and thereby inserts the advertising phrase "sport car A" into the text of the electronic book. In this case, the electronic book into which the advertising phrase has been inserted by the advertising phrase insertion unit 208 is the same as the example shown in FIG. 19.

The output control unit 202*a* causes the output unit (for example, the display unit or the sound output unit) included in the terminal device 20 to output the electronic book into which the advertising phrase has been inserted by the advertising phrase insertion unit 208. The operation of the output control unit 202*a* is basically the same as that of the output control unit 202 in the first embodiment.

Figure 29:
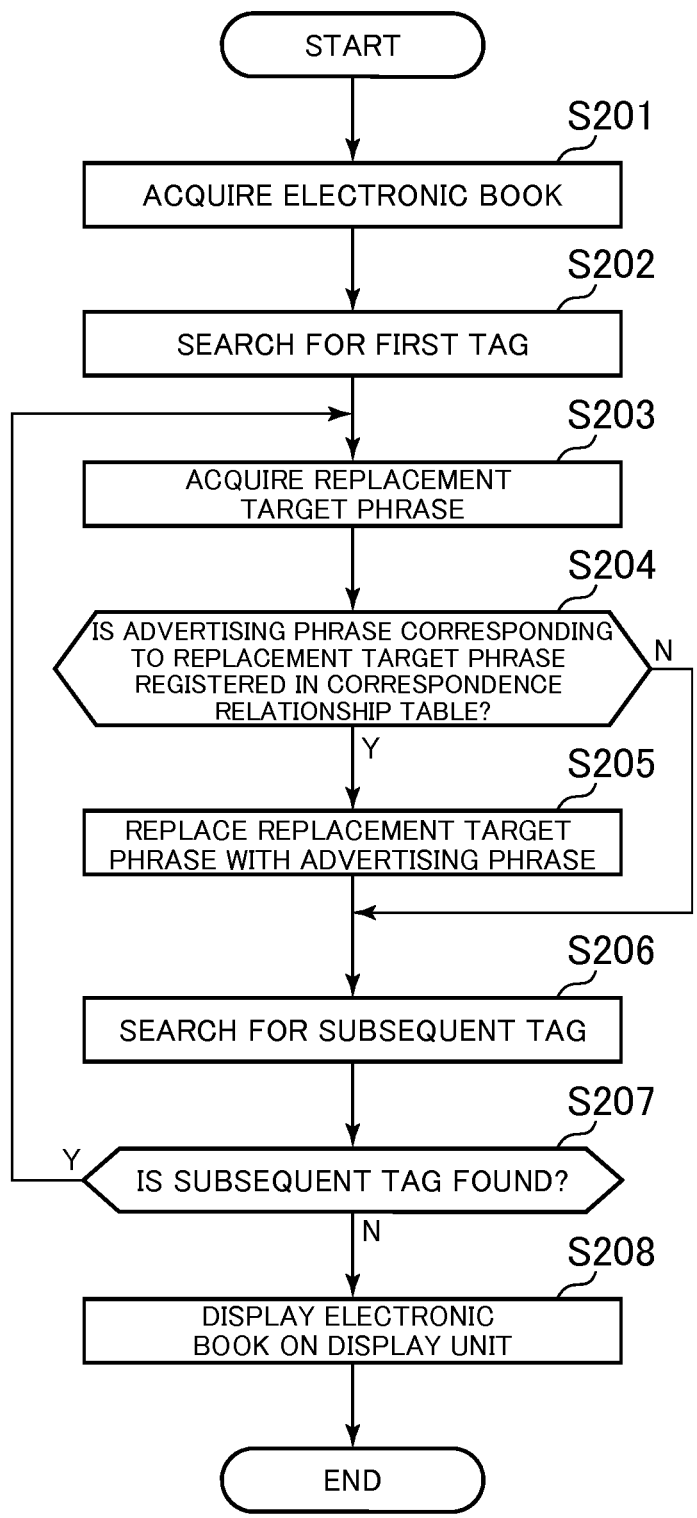
FIG. 29 A flowchart showing an example of the processing performed in the terminal device in the second embodiment.

Processing that is performed by the terminal device 20 when the electronic book and the correspondence relationship table are received by the terminal device 20 will now be described. FIG. 29 is a flowchart showing an example of the processing that is performed by the terminal device 20 when the electronic book and the correspondence relationship table are received by the terminal device 20. The control unit of the terminal device 20 performs the processing shown in FIG. 29 according to the program stored in the auxiliary storage unit, and thus the control unit functions as the advertising phrase insertion unit 208 and the output control unit 202*a*. The processing shown in FIG. 29 indicates processing when the electronic book data and the correspondence relationship table are the data and the table as shown in FIGS. 5 and 13.

When the electronic book and the correspondence relationship table are received by the terminal device 20, as shown in FIG. 29, the control unit of the terminal device 20 acquires the received electronic book (S201). Thereafter, the control unit searches for the first tag embedded into the text of the electronic book (S202). When the first tag is found, the control unit acquires the replacement target phrase indicated by the tag (S203). The processing of steps S202 and S203 are the same as that of steps S102 and S103 in FIG. 11.

After the processing of step S203 is performed, the control unit references the received correspondence relationship table (FIG. 13), and thereby determines whether or not the advertising phrase corresponding to the replacement target phrase acquired in step S203 is registered in the correspondence relationship table (S204).

If the advertising phrase corresponding to the replacement target phrase acquired in step S203 is registered in the correspondence relationship table, the control unit acquires the advertising phrase, and replaces, in the electronic book acquired in step S201, the replacement target phrase indicated by the tag found in step S202 with the acquired advertising phrase (S205). Then, the control unit performs processing of step S206, which will be described later.

On the other hand, if the advertising phrase corresponding to the replacement target phrase acquired in step S203 is not registered in the correspondence relationship table, the control unit does not replace the replacement target phrase indicated by the tag found in step S202, and performs processing of step S206, which will be described later, without any processing on the replacement target phrase.

In step S206, the control unit searches for the subsequent tag embedded in the text of the electronic book. Then, the control unit determines whether or not the subsequent tag is found (S207). When the subsequent tag is found, the control unit acquires the replacement target phrase indicated by the tag (S203). The control unit references the received correspondence relationship table (FIG. 13), and determines whether or not the advertising phrase corresponding to the replacement target phrase acquired in step S203 is registered in the correspondence relationship table (S204).

If the advertising phrase corresponding to the replacement target phrase acquired in step S203 is registered in the correspondence relationship table, the control unit acquires the advertising phrase, and replaces, in the electronic book, the replacement target phrase indicated by the tag found in step S206 with the acquired advertising phrase (S205). Then, control unit performs the processing of step S206, which will be described later, and further searches for the subsequent tag.

On the other hand, if the advertising phrase corresponding to the replacement target phrase acquired in step S203 is not registered in the correspondence relationship table, the control unit does not replace the replacement target phrase indicated by the tag found in step S206, and performs the processing of step S206, which will be described later, without any processing on the replacement target phrase. Then, the control unit further searches for the subsequent tag.

A case where it is determined in step S207 that the subsequent tag is not found means a case where the detection of all the tags embedded in the text of the electronic book is completed. In this case, the electronic book into which the advertising phrase has been inserted instead of the replacement target phrase is generated. In this case, the control unit (the output control unit 202a) displays the electronic book on the display unit (S207). In this way, the electronic book into which the advertising phrase has been inserted instead of the replacement target phrase is displayed on the display unit.

The processing in the case where the electronic book data and the correspondence relationship table are the data and the table as shown in FIGS. 5 and 13 has been described above. Here, the processing in a case where the electronic book data and the correspondence relationship table are the data and the table as shown in FIGS. 7 and 16 will also be described. The processing in the case where the electronic book data and the correspondence relationship table are the data and the table as shown in FIGS. 7 and 16 differs from the processing in the case where the electronic book data and the correspondence relationship table are the data and the table as shown in FIGS. 5 and 13 in the following respects.

When the electronic book data and the correspondence relationship table are the data and the table as shown in FIGS. 7 and 16, the tag found in step S202 (or S206) is acquired in step S203 of FIG. 29. Then, in step S204 of FIG. 29, whether or not the advertising phrase corresponding to the tag acquired in step S203 is registered in the correspondence relationship table is determined.

The processing in a case where the electronic book data and the correspondence relationship table are the data and the table as shown in FIGS. 9 and 18 will also be described. The processing in the case where the electronic book data and the correspondence relationship table are the data and the table as shown in FIGS. 9 and 18 differs from the processing in the case where the electronic book data and the correspondence relationship table are the data and the table as shown in FIGS. 5 and 13 in the following respects.

When the electronic book data and the correspondence relationship table are the data and the table as shown in FIGS. 9 and 18, the tag found in step S202 (or S206) is acquired in step S203 of FIG. 29. Then, in step S204 of FIG. 29, whether or not the advertising phrase corresponding to the tag acquired in step S203 is registered in the correspondence relationship table is determined.

In step S205 of FIG. 29, the advertising phrase corresponding to the tag acquired in step S203 is acquired. Then, the acquired advertising phrase is inserted into position indicated by the tag found in step S202 (or step S206). For example, the advertising phrase is inserted behind the tag found in step S202 (or step S206).

If it is determined in step S204 of FIG. 29 that the advertising phrase corresponding to the tag acquired in step S203 is not registered in the correspondence relationship table, the original phrase corresponding to the tag acquired in step S203 is acquired. Then, the acquired original phase is inserted into the position indicated by the tag found in step S202 (or step S206). For example, the original phrase is inserted behind the tag found in step S202 (or step S206). Then, the processing of step S206 is performed.

The description of the processing performed in the terminal device 20 when the electronic book and the correspondence relationship table are received in the terminal device 20 has been completed.

Also in the electronic book provision system 1 according to the second embodiment described above, the advertising phrase is inserted into the text of the electronic book (for example, a novel). According to the electronic book provision system 1, when the user reads the electronic book (for example, a novel), the user inevitably notices the advertisement. Further, according to the electronic book provision system 1, it is possible to fit the advertisement into the text of the electronic book and more naturally perform advertising.

As shown in FIG. 26, the electronic book provision system 1 according to the second embodiment includes not only the functional blocks described above but also a basic information transmission unit 204a, a basic information acquisition unit 112a and an advertisement billing unit 114a.

The basic information transmission unit 204a is realized by the terminal device 20. In other words, the control unit of the terminal device 20 performs processing according to the program stored in the auxiliary storage unit, and thus the control unit functions as the basic information transmission unit 204a.

The basic information acquisition unit 112a and the advertisement billing unit 114a are realized by the distribution system 10. For example, the basic information acquisition unit 112a and the advertisement billing unit 114a are realized by the electronic book distribution device 12. In other words, the control unit of the electronic book distribution device 12 performs processing according to the program stored in the auxiliary storage unit, and thus the control unit functions as the basic information acquisition unit 112a and the advertisement billing unit 114a.

The basic information transmission unit 204a transmits, to the distribution system 10, information used as the basis for calculation when the billing amount for the advertiser is calculated. The basic information acquisition unit 112a acquires the information used as the basis for calculation when the billing amount for the advertiser is calculated. For example, the basic information acquisition unit 112a receives information transmitted by the basic information transmission unit 204a to acquire the information used as the basis for calculation when the billing amount for the advertiser is calculated. The advertisement billing unit 114a calculates the billing amount for the advertiser based on the information acquired in the basic information acquisition unit 112.

Examples of the information acquired by the basic information acquisition unit 112a will be described. Here, four examples [A] to [D] will be described. A description will be given below with the assumption that the company X is the advertiser.

[A] For example, the basic information acquisition unit 112a acquires information on the number of times the correspondence relationship table (correspondence relationship information) in which the advertising phrase (sport car A) of the company X is associated with the replacement target phrase or the tag is transmitted by the correspondence relationship information transmission unit 122.

Based on the advertising phrase table (FIG. 6, 8, or 10) and the distribution history table (FIG. 15), the basic information acquisition unit 112a acquires the number of times the correspondence relationship table in which the advertising phrase of the company X is associated with the replacement target phrase or the tag is distributed. In other words, the basic information acquisition unit 112a acquires the advertising phrase of the company X based on the advertising phrase table, and acquires the number of times the correspondence relationship table in which the advertising phrase of the company X is associated with the replacement target phrase or the tag is distributed, based on the "advertising phrase information" field of the distribution history table.

A method of acquiring the number of times the correspondence relationship table in which the advertising phrase of the company X is associated with the replacement target phrase or the tag is distributed is not limited to the above method. For example, the database 14 stores a counter such that the counter is associated with the company X, and the basic information acquisition unit 112a may increment the value of the counter by one each time the correspondence relationship table in which the advertising phrase of the company X is associated with the replacement target phrase or the tag is distributed.

The advertisement billing unit 114a calculates the billing amount for the company X based on the number of times the correspondence relationship table in which the advertising phrase of the company X is associated with the replacement target phrase or the tag is distributed.

The operation of the advertisement billing unit 114a in this case is the same as that of the advertisement billing unit 114 in example [A] described in the first embodiment. In other words, the configuration that calculates the billing amount for the company X based on the number of times the correspondence relationship table in which the advertising phrase of the company X is associated with the replacement target phrase or the tag is distributed is the same as the configuration that calculates the billing amount for the company X based on the number of times the electronic book having the advertising phrase of the company X inserted is distributed. Hence, its description will be omitted.

[B] For example, the basic information transmission unit 204a acquires information on the number of advertising phrases of the company X inserted into the text of the electronic book based on the electronic book into which the advertising phrases have been inserted by the advertising phrase insertion unit 208, and transmits the information to the distribution system 10. Then, the basic information acquisition unit 112a receives the information transmitted by the basic information transmission unit 204a, and thereby acquire the information on the number of advertising phrases of the company X inserted into the text of the electronic book.

The advertisement billing unit 114a calculates the billing amount for the company X produced by the insertion of the advertising phrases of the company X into the text of the electronic book, based on the number of advertising phrases of the company X inserted into the text of the electronic book. The operation of the advertisement billing unit 114a in this case is the same as that of the advertisement billing unit 114 in example [B] described in the first embodiment. Hence, its description will be omitted.

The number of advertising phrases of the company X inserted into the text of the electronic book is equal to the number of "replacement target phrases or tags associated with the advertising phrase of the company X" included in the original electronic book (that is, the electronic book before the insertion of the advertising phrase by the advertising phrase insertion unit 108). For example, the number of advertising phrases "sport car A" included in the text of the electronic book shown in FIG. 14, 17, or 19 is equal to the number of replacement target phrases "car" included in the text of the electronic book shown in FIG. 5, the number of combinations of <car> and </car> included in the text of the electronic book shown in FIG. 7, or the number of <car> included in the text of the electronic book shown in FIG. 9.

The number of "replacement target phrases or tags associated with the advertising phrase of the company X" included in the original electronic book (that is, the electronic book transmitted by the electronic book transmission unit 110a) can be acquired based on the correspondence relationship table shown in FIG. 13, 16, or 18.

Hence, the basic information acquisition unit 112 acquires the number of "replacement target phrases or tags associated with the advertising phrases of the company X" included in the original electronic book (that is, the electronic book transmitted by the electronic book transmission unit 110a), and thereby may acquire the number of advertising phrases of the company X inserted into the text of the electronic book.

In this way, it is possible to determine (or predict) the billing amount for the advertiser before the transmission of the electronic book to the terminal device 20 (that is, before the generation of the electronic book into which the advertising phrase has been inserted).

[C] For example, the basic information transmission unit 204a transmits, to the distribution system 10, information on the number of times the advertising phrase is output in the terminal device 20. Then, the basic information acquisition unit 112a receives the information transmitted by the basic information transmission unit 204a, and thereby acquire the information on the number of times the advertising phrase is output in the terminal device 20.

The advertisement billing unit 114a calculates the billing amount for the company X based on the number of times the advertising phrase of the company X is output in the terminal device 20. The operation of the advertisement billing unit 114a in this case is the same as that of the advertisement billing unit 114 in example [C] described in the first embodiment. Hence, its description will be omitted.

[D] For example, the basic information transmission unit 204a acquires information on the position of the advertising phrase of the company X inserted into the text of the electronic book based on the electronic book into which the advertising phrase has been inserted by the advertising phrase insertion unit 208, and transmits the information to the distribution system 10. Then, the basic information acquisition unit 112a receives the information transmitted by the basic information transmission unit 204a, and thereby acquire the information on the position of the advertising phrase of the company X inserted into the text of the electronic book.

The advertisement billing unit 114a determines the billing amount for the company X produced by the insertion of the advertising phrases of the company X into the text of the electronic book, based on the position in which the advertising phrase of the company X is inserted. The operation of the advertisement billing unit 114a in this case is the same as that of the advertisement billing unit 114 in example [D]([D-1] to [D-3]) described in the first embodiment. Hence, its description will be omitted.

The position in which the advertising phrase of the company X is inserted is the same as the position of "the replacement target phrase or the tag associated with the advertising phrase of the company X" included in the original electronic book (that is, the electronic book transmitted by the electronic book transmission unit 110a). For example, the position of the advertising phrase "sport car A" included in the text of the electronic book shown in FIG. 14, 17, or 19 is the same as the position of the replacement target phrase "car" included in the text of the electronic book shown in FIG. 5, the position of the replacement target phrase "car" sandwiched between <car> and </car> included in the text of the electronic book shown in FIG. 7, or the position of <car> included in the text of the electronic book shown in FIG. 9.

The position of "the replacement target phrase or the tag associated with the advertising phrase of the company X" included in the original electronic book (that is, the electronic book transmitted by the electronic book transmission unit 110a) can be acquired based on the correspondence relationship table shown in FIG. 13, 16, or 18.

Hence, the basic information acquisition unit 112a acquires the position of "the replacement target phrase or the tag associated with the advertising phrase of the company X" included in the original electronic book (that is, the electronic book transmitted by the electronic book transmission unit 110a), and thereby may acquire the position of the advertising phrase of the company X inserted.

In this way, it is possible to determine (or predict) the billing amount for the advertiser before the transmission of the electronic book to the terminal device 20 (that is, before the generation of the electronic book into which the advertising phrase has been inserted).

As shown in FIG. 29, the electronic book provision system 1 according to the second embodiment includes not only the functional blocks described above but also a sales price determination unit 116a.

The sales price determination unit 116a is realized by the distribution system 10. For example, the sales price determination unit 116a is realized by the electronic book distribution device 12. In other words, the control unit of the electronic book distribution device 12 performs processing according to the program stored in the auxiliary storage unit, and thus the control unit functions as the sales price determination unit 116a.

The sales price determination unit 116a determines the sales price for the electronic book based on the billing amount for the advertiser associated with the advertising phrase produced by the insertion of the advertising phrase into the text of the electronic book.

As described above, it is also possible to determine (or predict) the billing amount for the advertiser before the transmission of the electronic book to the terminal device 20 (that is, before the generation of the electronic book into which the advertising phrase has been inserted). On the assumption of this type of case, the sales price determination unit 116a determines the sales price for the electronic book based on the billing amount for the advertiser associated with the advertising phrase produced by the insertion of the advertising phrase into the text of the electronic book. The operation of the sales price determination unit 116a is basically the same as that of the sales price determination unit 116 in the first embodiment. Hence, its description will be omitted.

As shown in FIG. 29, the electronic book provision system 1 according to the second embodiment includes not only the functional blocks described above but also the point information storage unit 118 and a point information update unit 120a.

The point information storage unit 118 is the same as that in the first embodiment. Hence, its description will be omitted.

The point information update unit 120a is realized by the distribution system 10. For example, the point information update unit 120a is realized by the electronic book distribution device 12. In other words, the control unit of the electronic book distribution device 12 performs processing according to the program stored in the auxiliary storage unit, and thus the control unit functions as the point information update unit 120a.

The point information update unit 120a updates the point information stored to associate with identification information on the user (that is, the user who purchases the electronic book) who is provided with the electronic book, based on the billing amount for the advertiser associated with the advertising phrase produced by the insertion of the advertising phrase in the text of the electronic book. The operation of the point information update unit 120a is basically the same as that of the point information update unit 120 in the first embodiment. Hence, its description will be omitted.

As in the first embodiment, the electronic book provision system 1 according to the second embodiment may include any one of the sales price determination unit 116a and the point information update unit 120a (and the point information storage unit 118).

The present invention is not limited to the first embodiment and the second embodiment described above.

(1) For example, in the second embodiment, when the terminal device 20 accesses the distribution system 10 after the electronic book and the correspondence relationship table are received by the terminal device 20, the correspondence relationship information transmission unit 122 may transmit, to the terminal device 20, a new correspondence relationship table for the electronic book transmitted to the terminal device 20 in the past.

The "when the terminal device 20 accesses the distribution system 10" refers to, for example, when the terminal device 20 accesses the distribution system 10 in order to purchase another electronic book. For example, the terminal device 20 may periodically access the distribution system 10, and in this case, "when the terminal device 20 accesses the distribution system 10" refers to when the terminal device 20 periodically accesses the distribution system 10.

The "new correspondence relationship table for the electronic book transmitted to the terminal device 20 in the past" refers to a correspondence relationship table in which the correspondence relationship between the replacement target phrase or tag included in the electronic book transmitted to the terminal device 20 in the past and the advertising phrase is updated. In other words, the "new correspondence relationship table for the electronic book transmitted to the terminal device 20 in the past" differs from the correspondence relationship table transmitted together with the electronic book to the terminal device 20 in the past in the correspondence relationship between the replacement target phrase or tag and the advertising phrase.

When the new correspondence relationship table is transmitted to the terminal device 20, the advertising phrase insertion unit 208 of the terminal device 20 regenerates the electronic book into which the advertising phrase has been inserted, based on the new correspondence relationship table. In this case, it is necessary to store the electronic book before the insertion of the advertising phrase in the auxiliary storage unit (reception electronic book storage means) of the terminal device 20.

In this way, it is possible to change the advertising phrase that is inserted into the text of the electronic book.

(2) For example, in the second embodiment, the advertising phrase table (FIG. 6) may be transmitted to the terminal device 20 instead of the correspondence relationship table (FIG. 13, 16, or 18).

(3) For example, the advertising phrase insertion units 108 and 208 may predict whether or not a new line is started halfway through the advertising phrase when the electronic book into which the advertising phrase has been inserted is displayed on the display unit. The advertising phrase insertion units 108 and 208 may prevent, based on the result of the prediction, the insertion of the advertising phrases. In other words, when it is predicted that a new line is started halfway through the advertising phrase, the advertising phrase insertion units 108 and 208 may prevent the insertion of the advertising phrase.

Figure 30:
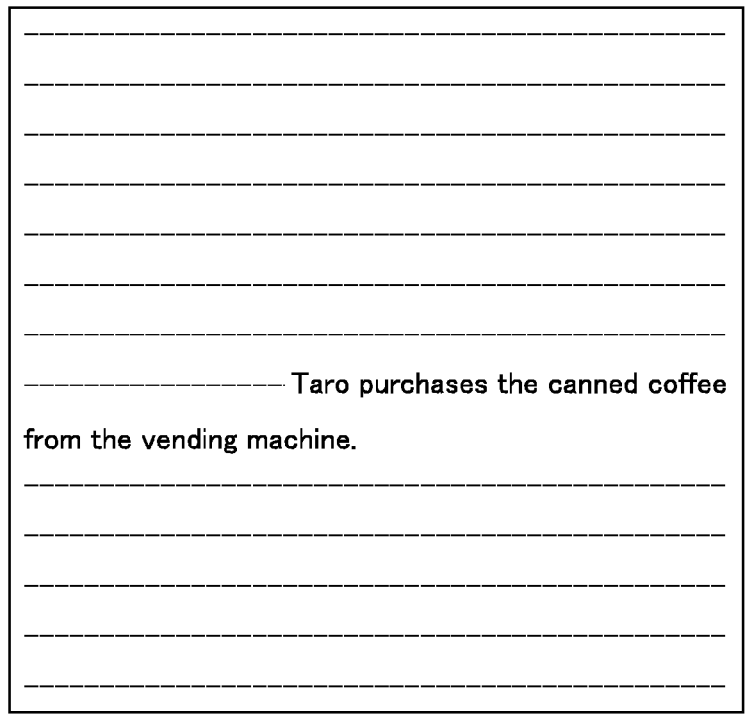
FIG. 30 A diagram for illustrating a method of predicting whether or not a new line is started halfway through the advertising phrase.

A method of predicting whether or not a new line is started halfway through the advertising phrase when the electronic book into which the advertising phrase has been inserted is displayed on the display unit will now be described. FIG. 30 is a diagram for illustrating an example of this prediction method, and shows an example of the display in a case where it is assumed that the electronic book in which the replacement target phrase (here, "canned coffee") has not been replaced with the advertising phrase (for example, "black coffee B") is displayed on the display unit. Here, it is assumed that the tag (FIGS. 5 and 7) indicating the replacement target phrase is set in the text of the electronic book.

When the above prediction is performed, the advertising phrase insertion units 108 and 208 first acquire how many characters can be displayed in the portion from the display position of the first character of the replacement target phrase to the end of line (including the display position of the first character of the replacement target phrase).

In order to acquire how many characters can be displayed in the portion from the display position of the first character of the replacement target phrase to the end of line, for example, it is necessary to store information on how many characters can be displayed per line on the display screen of the terminal device 20. When the advertising phrase insertion unit 108 realized by the distribution system 10 (the electronic book distribution device 12) is made to perform the above prediction, for example, it is necessary to previously store, in the auxiliary storage unit of the electronic book distribution device 12 or the database 14, the information on how many characters can be displayed per line on the display screen of the terminal device 20.

After how many characters can be displayed in the portion from the display position of the first character of the replacement target phrase to the end of line is acquired, the advertising phrase insertion units 108 and 208 compare the acquired number of characters with the number of characters of the advertising phrase (for example, "black coffee B") corresponding to the replacement target phrase. A case where the acquired number of characters is equal to or more than the number of characters of the advertising phrase refers to a case where a new line is not started halfway through the advertising phrase even if the replacement target phrase is replaced with the advertising phrase. In this case, the advertising phrase insertion units 108 and 208 replace the replacement target phrase with the advertising phrase. On the other hand, a case where the acquired number of characters is less than the number of characters of the advertising phrase refers to a case where a new line is started halfway through the advertising phrase if the replacement target phrase is replaced with the advertising phrase. In this case, the advertising phrase insertion units 108 and 208 do not replace the replacement target phrase with the advertising phrase.

The processing as described above is preferably performed in steps S107 or S110 of FIG. 11, step S117 of FIG. 12, or step S205 of FIG. 29.

Figure 31:
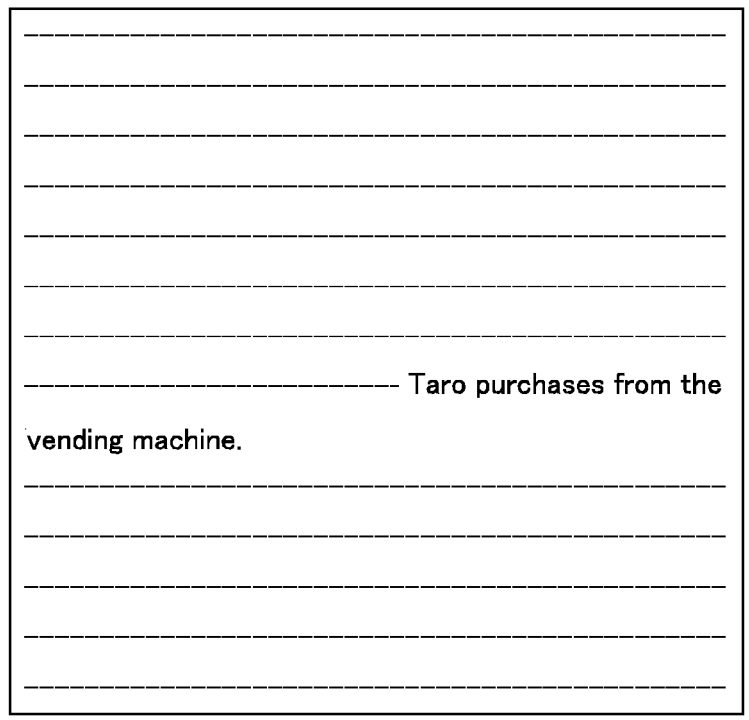
FIG. 31 A diagram for illustrating the method of predicting whether or not a new line is started halfway through the advertising phrase.

The case where the tag (FIG. 5 or 7) indicating the replacement target phrase is set in the text of the electronic book has been described above, and a case where the tag (FIG. 9) indicating the position into which the advertising phrase needs to be inserted is set in the text of the electronic book will also be described. FIG. 31 is a diagram for illustrating the above prediction method in the case where the tag (FIG. 9) indicating the position into which the advertising phrase needs to be inserted is set in the text of the electronic book. In the case of the example shown in FIG. 31, the position into which the advertising phrase needs to be inserted is, for example, the position into which the advertising phrase such as "black coffee B" needs to be inserted.

In this case, the advertising phrase insertion units 108 and 208 acquire how many characters can be displayed in the portion from the display position of the character immediately after the position into which the advertising phrase needs to be inserted to the end of line (including the display position of the character immediately after the position into which the advertising phrase needs to be inserted).

Thereafter, the advertising phrase insertion units 108 and 208 compare the acquired number of characters with the number of characters of the advertising phrase (for example, "black coffee B"). A case where the acquired number of characters is equal to or more than the number of characters of the advertising phrase refers to a case where a new line is not started halfway through the advertising phrase even if the advertising phrase is inserted. In this case, the advertising phrase insertion units 108 and 208 insert the advertising phrase. On the other hand, a case where the acquired number of characters is less than the number of characters of the advertising phrase refers to a case where a new line is started halfway through the advertising phrase if the advertising phrase is inserted. In this case, the advertising phrase insertion units 108 and 208 insert the original phrase (for example, "canned coffee").

If a new line is started halfway through the advertising phrase, the advertisement is unlikely to be recognized by the user, and thus its advertising effect is likely to be lowered. In this respect, according to the above configuration, it is possible to prevent the advertising phrase from being displayed if the advertising effect is lowered, with the result that it is possible to more efficiently perform advertising.

(4) For example, when the electronic book into which the advertising phrase has been inserted is displayed on the display unit, the output control units 202 and 202a may prevent a new line from being started halfway through the advertising phrase. In other words, the output control units 202 and 202a may determine whether or not a new line is started halfway through the advertising phrase, based on the number of characters per line on the display unit of the terminal device 20. Thereafter, the output control units 202 and 202a may start a new line before the advertising phrase if it is determined that a new line is started halfway through the advertising phrase.

Figure 32:
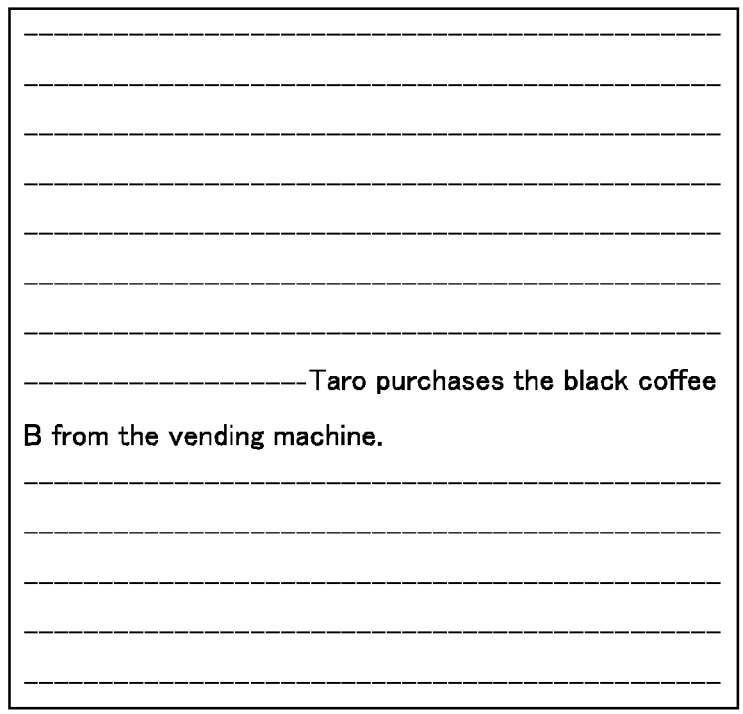
FIG. 32 A diagram for illustrating the method of determining whether or not a new line is started halfway through the advertising phrase.

A method of determining whether or not a new line is started halfway through the advertising phrase will now be described. FIG. 32 is a diagram for illustrating an example of this determination method, and shows a display example when the electronic book in which the advertising phrase (here, "black coffee B") has been inserted is displayed on the display unit without the position of the new line being adjusted.

In this case, the output control units 202 and 202a first acquire how many characters can be displayed in the portion from the display position of the first character of the advertising phrase (here, "black coffee B") to the end of line (including the display position of the first character of the advertising phrase).

Thereafter, the output control units 202 and 202a compare the acquired number of characters with the number of characters of the advertising phrase ("black coffee B"). A case where the acquired number of characters is equal to or more than the number of characters of the advertising phrase refers to a case where a new line is not started halfway through the advertising phrase. In this case, the output control units 202 and 202a do not particularly adjust the position in which the new line is started. On the other hand, a case where the acquired number of characters is less than the number of characters of the advertising phrase refers to a case where a new line is started halfway through the advertising phrase if the position in which the new line is started is not adjusted. In this case, the output control units 202 and 202a set a position before the advertising phrase as the position of the new line is started. For example, in the case of the example shown in FIG. 32, the output control units 202 and 202a start the new line before the first character of the advertising phrase ("black coffee B").

(5) For example, when the advertising phrase is clicked or when the advertising phrase is indicated, the output control units 202 and 202a may display a web page on the advertising phrase on the display unit. In this case, link information on the web page on the advertising phrase is embedded in the electronic book together with the advertising phrase.

When the advertising phrase is clicked or when the advertising phrase is indicated (for example, when the advertising phrase is rolled over or when the position on the touch panel corresponding to the display position of the advertising phrase is touched), the output control units 202 and 202a may display the original phrase on the display unit. For example, the original phrase may be balloon-displayed. Alternatively, the original phrase may be output as a sound.

(6) For example, the output control units 202 and 202a may prevent the display of the advertising phrase included in the page displayed on the display unit of the terminal device 20 in the past and may display the original phrases. With respect to the page displayed on the display unit of the terminal device 20 in the past, the advertising phrase may be returned to the original phrase.

(7) For example, the advertisement billing units 114 and 114a may be realized by a server computer different from the electronic book distribution device 12. Likewise, the sales price determination units 116 and 116a may be realized by a server computer different from the electronic book distribution device 12. The point information update units 120 and 120a may also be realized by a server computer different from the electronic book distribution device 12.

The database 14 may be structured within a server computer different from the electronic book distribution device 12 or may be structured within the electronic book distribution device 12.

(8) For example, the electronic book may be distributed by streaming.

(9) For example, the form of the tag is not limited to the forms shown in FIG. 5, 7, or 9. As long as it is possible to identify the replacement target phrase or the position into which the advertising phrase needs to be inserted, any form may be adopted. For example, a tag which is not sandwiched between < > may be adopted as the tag.

The invention claimed is:

1. An electronic book provision system that provides a user with an electronic book, and comprises a terminal device and a distribution system for distributing an electronic book to the terminal device, wherein the distribution system comprises:
a first acquiring means for acquiring an electronic book stored in an electronic book storage means for storing the electronic book where a tag is set in a text of the electronic book, wherein the tag indicates either a phrase specified by an author of the electronic book as a replacement target phrase in the text of the electronic book to be replaced with an advertising phrase on an advertisement or a position specified by the author of the electronic book as a position in the text of the electronic book into which the advertising phrase is inserted instead of an original phrase; and
a second acquiring means for acquiring the stored content of an advertising phrase storage means, wherein the advertising phrase storage means stores a combination, specified by an advertiser, of the replacement target phrase and the advertising phrase, or a combination, specified by the advertiser, of the tag and the advertising phrase, in a case where the electronic book stored in the electronic book storage means is the electronic book where the tag indicating the replacement target phrase is set in the text, and the advertising phrase storage means stores a combination, specified by the advertiser, of the tag and the advertising phrase, in a case where the electronic book stored in the electronic book storage means is the electronic book where the tag indicating the position is set in the text, the electronic book provision system comprises:
an advertising phrase insertion means for inserting the advertising phrase into the text of the electronic book based on the tag included in the text of the electronic book and the stored content of the advertising phrase storage means and the terminal device comprises:
an output control means for causing output means included in the terminal device to output the electronic book into which the advertising phrase has been inserted by the advertising phrase insertion means.

2. The electronic book provision system of claim 1, wherein the electronic book stored in the electronic book storage means is the electronic book where the tag indicating the replacement target phrase is set in the text, the advertising phrase storage means stores the combination, specified by the advertiser, of the replacement target phrase and the advertising phrase, or the combination, specified by the advertiser, of the tag and the advertising phrase and the advertising phrase insertion means inserts the advertising phrase into the text of the electronic book by replacing the replacement target phrase in the text of the electronic book indicated by the tag with the advertising phrase associated with the replacement target phrase or the tag.

3. The electronic book provision system of claim 2, wherein the advertising phrase storage means stores the combination, specified by the advertiser, of the replacement target phrase and the advertising phrase, and the advertising phrase insertion means determines whether or not the replacement target phrase in the text of the electronic book indicated by the tag corresponds to the replacement target phrase associated with the advertising phrase, and inserts the advertising phrase into the text of the electronic book by replacing the replacement target phrase in the text of the electronic book indicated by the tag with the advertising phrase associated with the replacement target phrase, in a case where the replacement target phrase in the sentence of the electronic book indicated by the tag corresponds to the replacement target phrase associated with the advertising phrase.

4. The electronic book provision system of claim 2, wherein the advertising phrase storage means stores the combination, specified by the advertiser, of the tag and the advertising phrase, and the advertising phrase insertion means inserts the advertising phrase into the text of the electronic book by replacing the replacement target phrase in the text of the electronic book indicated by the tag with the advertising phrase associated with the tag.

5. The electronic book provision system of claim 1, wherein the electronic book stored in the electronic book storage means is the electronic book where the tag indicating the position is set in the text, the advertising phrase storage means stores the combination, specified by the advertiser, of the tag and the advertising phrase and the advertising phrase insertion means inserts the advertising phrase associated with the tag into the position in the text of the electronic book indicated by the tag.

6. The electronic book provision system of claim 1, wherein the advertising phrase insertion means is comprised in the distribution system, the distribution system further comprises electronic book transmission means for transmitting, to the terminal device, the electronic book into which the advertising phrase has been inserted by the advertising phrase insertion means, the terminal device further comprises electronic book reception means for receiving the electronic book transmitted by the electronic book transmission means and the output control means causes the output means to output the electronic book into which the advertising phrase has been inserted by the advertising phrase insertion means, based on the electronic book received by the electronic book reception means.

7. The electronic book provision system of claim 2, wherein the distribution system further comprises:
an electronic book transmission means for transmitting, to the terminal device, the electronic book acquired by the electronic book acquisition means; and
a correspondence relationship transmission means for acquiring correspondence relationship information on a correspondence relationship between the replacement target phrase or the tag and the advertising phrase based on the stored content of the advertising phrase storage means, and transmitting the correspondence relationship information to the terminal device, the terminal device further comprises:
an electronic book reception means for receiving the electronic book transmitted by the electronic book transmission means; and
a correspondence relationship information reception means for receiving the correspondence relationship information transmitted by the correspondence relationship information transmission means, the advertising phrase insertion means is comprised in the terminal device and the advertising phrase insertion means inserts the advertising phrase into the text of the electronic book based on the tag included in the text of the electronic book and the correspondence relationship information received by the correspondence relationship information reception means.

8. The electronic book provision system of claim 7, wherein the terminal device comprises means for storing, in a reception electronic book storage means, the electronic book received by the electronic book reception means, the correspondence relationship transmission means transmits, to the terminal device, the correspondence relationship information obtained by updating the correspondence relationship between the replacement target phrase or the tag and the advertising phrase, in a case where the terminal device accesses the distribution system after the correspondence relationship information is transmitted to the terminal device, and the advertising phrase insertion means inserts the advertising phrase into the text of the electronic book based on the electronic book stored in the reception electronic book storage means and the updated correspondence relationship information, in a case where the correspondence relationship information obtained by updating the correspondence relationship between the replacement target phrase or the tag and the advertising phrase is received.

9. The electronic book provision system of claim 5, wherein the distribution system further comprises:
an electronic book transmission means for transmitting, to the terminal device, the electronic book acquired by the electronic book acquisition means; and a correspondence relationship information transmission means for acquiring correspondence relationship information on a correspondence relationship between the tag and the advertising phrase based on the stored content of the advertising phrase storage means, and transmitting the correspondence relationship information to the terminal device, the terminal device further comprises:
an electronic book reception means for receiving the electronic book transmitted by the electronic book transmission means; and
a correspondence relationship information reception means for receiving the correspondence relationship information transmitted by the correspondence relationship information transmission means, the advertising phrase insertion means is comprised in the terminal device and the advertising phrase insertion means inserts the advertising phrase into the text of the electronic book based on the tag included in the text of the electronic book and the correspondence relationship information received by the correspondence relationship information reception means.

10. The electronic book provision system of claim 9, wherein
the terminal device comprises means for storing, in a reception electronic book storage means, the electronic book received by the electronic book reception means,
the correspondence relationship transmission means transmits, to the terminal device, the correspondence relationship information obtained by updating the correspondence relationship between the tag and the advertising phrase, in a case where the terminal device accesses the distribution system after the correspondence relationship information is transmitted to the terminal device, and
the advertising phrase insertion means inserts the advertising phrase into the text of the electronic book based on the electronic book stored in the reception electronic book storage means and the updated correspondence relationship information, in a case where the correspondence relationship information obtained by updating the correspondence relationship between the tag and the advertising phrase is received.

11. The electronic book provision system of claim 6, wherein
the distribution system comprises advertisement billing means for calculating a billing amount for an advertiser based on a number of times an electronic book including an advertising phrase associated with the advertiser is transmitted by the electronic book transmission means.

12. The electronic book provision system of claim 7, wherein
the distribution system comprises advertisement billing means for calculating a billing amount for an advertiser based on a number of times the correspondence relationship information in which an advertising phrase associated with the advertiser is associated with any of the replacement target phrase, or the tag is transmitted by the correspondence relationship information transmission means.

13. The electronic book provision system of claim 9, wherein
the distribution system comprises advertisement billing means for calculating a billing amount for an advertiser based on a number of times the correspondence relationship information in which an advertising phrase associated with the advertiser is associated with any tag is transmitted by the correspondence relationship information transmission means.

14. The electronic book provision system of claim 1, wherein
the distribution system comprises an advertisement billing means for calculating a billing amount for an advertiser based on a number of advertising phrases associated with the advertiser inserted into the electronic book.

15. The electronic book provision system of claim 1, wherein
the terminal device comprises a transmission means for transmitting, to the distribution system, information on a number of times the advertising phrase is output, and
the distribution system comprises:
a reception means for receiving the information transmitted by the transmission means; and
an advertisement billing means for calculating a billing amount for an advertiser based on the number of times the advertising phrase associated with the advertiser is output, indicated by the information received by the reception means.

16. The electronic book provision system of claim 1, wherein
the distribution system comprises advertisement billing means for calculating a billing amount for an advertiser based on a position in the text of the electronic book into which the advertising phrase associated with the advertiser is inserted.

17. The electronic book provision system of claim 16, wherein
the advertisement billing means comprises:
a means for acquiring the stored content of means for storing information on the billing amount for the advertiser such that the information is associated with a part of the text of the electronic book; and
a means for calculating the billing amount for the advertiser based on the information associated with a part including the position into which the advertising phrase associated with the advertiser is inserted.

18. The electronic book provision system of claim 16, wherein
the advertisement billing means calculates the billing amount for the advertiser based on a distance between the position into which the advertising phrase associated with the advertiser is inserted and a position into which another advertising phrase is inserted.

19. The electronic book provision system of claim 16, wherein
the advertisement billing means calculates the billing amount for the advertiser based on a result of a comparison between a number of advertising phrases associated with the advertiser inserted into a predetermined number of pages of the electronic book and a number of advertising phrases other than the advertising phrases inserted into the predetermined number of pages of the electronic book.

20. The electronic book provision system of claim 1, wherein
the distribution system comprises sales price determination means for determining a sales price for the electronic book based on a billing amount for an advertiser produced by insertion of the advertising phrase into the text of the electronic book.

21. The electronic book provision system of claim 1, wherein
the distribution system comprises:
a point storage means for storing point information such that the point information is associated with user identification information for identifying each user, wherein the point information indicates how may points are possessed by the user, and the points can be used as a currency when the electronic book is purchased; and
a point information update means for updating the point information stored to be associated with the identification information of the user that is provided with the electronic book such that the points possessed by the user are increased, based on the billing amount for the advertiser produced by insertion of the advertising phrase into the electronic book.

22. The electronic book provision system of claim 1, wherein
the terminal device comprises display means that is capable of displaying a plurality of lines in the electronic book,
the output control means displays the electronic book on the display means while a new line is started according to a number of characters per line on the display means and
the output control means comprises means for preventing a new line from being started halfway through the advertising phrase, and starting a new line before the advertising phrase.

23. The electronic book provision system of claim 1, wherein
the terminal device comprises display means that is capable of displaying a plurality of lines in the electronic book,
the output control means displays the electronic book on the display means while a new line is started according to a number of characters per line on the display means and
the advertising phrase insertion means comprises:
a prediction means for predicting whether or not a new line is started halfway through the advertising phrase when the electronic book into which the advertising phrase has been inserted is displayed on the display means; and
a means for preventing the insertion of the advertising phrase based on a result of the prediction by the prediction means.

24. A method of controlling an electronic book provision system that includes a terminal device and a distribution system for distributing an electronic book to the terminal device, the method comprising:
a first acquiring step of acquiring, by the distribution system, an electronic book stored in an electronic book storage means for storing the electronic book where a tag is set in a text of the electronic book, wherein the tag indicates either a phrase specified by an author of the electronic book as a replacement target phrase in the text of the electronic book to be replaced with an advertising phrase on an advertisement or a position specified by the author of the electronic book as a position in the text of the electronic book into which the advertising phrase is inserted instead of an original phrase;
a second acquiring step of acquiring, by the distribution system, the stored content of an advertising phrase storage means, wherein the advertising phrase storage means stores a combination, specified by an advertiser, of the replacement target phrase and the advertising phrase, or a combination, specified by the advertiser, of the tag and the advertising phrase, in a case where the electronic book stored in the electronic book storage means is the electronic book where the tag indicating the replacement target phrase is set in the text, and the advertising phrase storage means stores a combination specified by the advertiser, of the tag and the advertising phrase, in a case where the electronic book stored in the electronic book storage means is the electronic book where the tag indicating the position is set in the text;
an advertising phrase insertion step of inserting, by the distribution system or the terminal device, the advertising phrase into the text of the electronic book based on the tag included in the text of the electronic book and the stored content of the advertising phrase storage means; and
an output control step of causing, by the terminal device, output means included in the terminal device to output the electronic book into which the advertising phrase has been inserted by the advertising phrase insertion step.

25. An electronic book distribution device for distributing an electronic book to a terminal device, the electronic book distribution device comprising:
a first acquiring means for acquiring an electronic book stored in an electronic book storage means for storing the electronic book where a tag is set in a text of the electronic book, wherein the tag indicates either a phrase specified by an author of the electronic book as a replacement target phrase in the text of the electronic book to be replaced with an advertising phrase on an advertisement or a position specified by the author of the electronic book as a position in the text of the electronic book into which the advertising phrase is inserted instead of an original phrase;
a second acquiring means for acquiring the stored content of an advertising phrase storage means, wherein the advertising phrase storage means stores a combination, specified by an advertiser, of the replacement target phrase and the advertising phrase, or a combination, specified by the advertiser, of the tag and the advertising phrase, in a case where the electronic book stored in the electronic book storage means is the electronic book where the tag indicating the replacement target phrase is set in the text, and the advertising phrase storage means stores a combination, specified by the advertiser, of the tag and the advertising phrase, in a case where the electronic book stored in the electronic book storage means is the electronic book where the tag indicating the position is set in the text;
an advertising phrase insertion means for inserting the advertising phrase into the text of the electronic book based on the tag included in the text of the electronic book and the stored content of the advertising phrase storage means; and
an electronic book transmission means for transmitting the electronic book into which the advertising phrase has been inserted by the advertising phrase insertion means to the terminal device.

26. A method of controlling an electronic book distribution device for distributing an electronic book to a terminal device, the method comprising:
a first acquiring step of acquiring an electronic book stored in an electronic book storage means for storing the electronic book where a tag is set in a text of the electronic book, wherein the tag indicates either a phrase specified by an author of the electronic book as a replacement target phrase in the text of the electronic book to be replaced with an advertising phrase on an advertisement or a position specified by the author of the electronic book as a position in the text of the electronic book into which the advertising phrase is inserted instead of an original phrase;

a second acquiring step of acquiring the stored content of an advertising phrase storage means, wherein the advertising phrase storage means stores a combination, specified by an advertiser, of the replacement target phrase and the advertising phrase, or a combination, specified by the advertiser, of the tag and the advertising phrase, in a case where the electronic book stored in the electronic book storage means is the electronic book where the tag indicating the replacement target phrase is set in the text, and the advertising phrase storage means stores a combination, specified by the advertiser, of the tag and the advertising phrase, in a case where the electronic book stored in the electronic book storage means is the electronic book where the tag indicating the position is set in the text;

an advertising phrase insertion step of inserting the advertising phrase into the text of the electronic book based on the tag included in the text of the electronic book and the stored content of the advertising phrase storage means; and an electronic book transmission step of transmitting the electronic book into which the advertising phrase has been inserted by the advertising phrase insertion step to the terminal device.

\* \* \* \* \*